(12) United States Patent
Uhrenholt et al.

(10) Patent No.: US 12,443,538 B2
(45) Date of Patent: Oct. 14, 2025

(54) CACHE SYSTEMS

(71) Applicant: Arm Limited, Cambridge (GB)

(72) Inventors: Olof Henrik Uhrenholt, Lund (SE);
Edvard Fielding, Trondheim (NO); Ole Henrik Jahren, Trondheim (NO)

(73) Assignee: Arm Limited, Cambridge (GB)

( * ) Notice: Subject to any disclaimer, the term of this patent is extended or adjusted under 35 U.S.C. 154(b) by 68 days.

(21) Appl. No.: 18/067,180

(22) Filed: Dec. 16, 2022

(65) Prior Publication Data

US 2023/0195638 A1    Jun. 22, 2023

(30) Foreign Application Priority Data

Dec. 21, 2021  (GB) ...................... 2118624
Dec. 21, 2021  (GB) ...................... 2118626
Dec. 21, 2021  (GB) ...................... 2118631

(51) Int. Cl.
*G06F 12/08*    (2016.01)
*G06F 12/0808*  (2016.01)
*G06F 12/0811*  (2016.01)
*G06F 12/0815*  (2016.01)
*G06F 12/0817*  (2016.01)
*G06F 12/0891*  (2016.01)

(52) U.S. Cl.
CPC ...... *G06F 12/0891* (2013.01); *G06F 12/0808* (2013.01); *G06F 12/0811* (2013.01); *G06F 12/0815* (2013.01); *G06F 12/0824* (2013.01); *G06F 2212/1016* (2013.01)

(58) Field of Classification Search
CPC .. G06F 12/08; G06F 12/0808; G06F 12/0891; G06F 12/0815; G06F 12/0824; G06F 12/0811; G06F 2212/1016
See application file for complete search history.

(56) References Cited

U.S. PATENT DOCUMENTS

| | | | |
|---|---|---|---|
| 6,996,584 B2 * | 2/2006 | White | G06F 12/0813 707/999.203 |
| 9,003,130 B2 * | 4/2015 | O'Connor | G06F 12/0864 711/146 |
| 9,189,402 B1 | 11/2015 | Smaldone et al. | |
| 10,802,967 B1 | 10/2020 | Ray et al. | |
| 11,061,594 B1 * | 7/2021 | Wang | G06F 3/0689 |

(Continued)

FOREIGN PATENT DOCUMENTS

| | | |
|---|---|---|
| EP | 3385848 | 10/2018 |
| EP | 3486784 | 5/2019 |

(Continued)

OTHER PUBLICATIONS

T. B. Berg, "Maintaining I/O Data Coherence in Embedded Multicore Systems," in IEEE Micro, vol. 29, No. 3, pp. 10-19, May-Jun. 2009.*

(Continued)

*Primary Examiner* — Pierre Michel Bataille
(74) *Attorney, Agent, or Firm* — Pearl Cohen Zedek Latzer Baratz LLP

(57) ABSTRACT

A method of operating a cache system is disclosed. Information indicating a link between associated header and payload cache entries is maintained. The link information may be used to reduce cache coherency traffic.

20 Claims, 14 Drawing Sheets

(56) References Cited

U.S. PATENT DOCUMENTS

| | | | | |
|---|---|---|---|---|
| 2003/0217081 | A1* | 11/2003 | White | G06F 12/0813 |
| | | | | 707/999.203 |
| 2004/0030833 | A1 | 2/2004 | Arimilli et al. | |
| 2006/0090036 | A1 | 4/2006 | Zohar et al. | |
| 2007/0104212 | A1* | 5/2007 | Gutman | G06F 12/0813 |
| | | | | 370/428 |
| 2015/0221063 | A1 | 8/2015 | Kim et al. | |
| 2015/0379684 | A1 | 12/2015 | Ramani et al. | |
| 2016/0154739 | A1 | 6/2016 | Jung et al. | |
| 2016/0283416 | A1* | 9/2016 | Ha | G06F 12/084 |
| 2017/0199820 | A1 | 7/2017 | Romanovskiy | |
| 2017/0256025 | A1 | 9/2017 | Abraham et al. | |
| 2017/0277805 | A1* | 9/2017 | Li | G06F 16/9574 |
| 2017/0371793 | A1 | 12/2017 | Saidi et al. | |
| 2018/0181491 | A1 | 6/2018 | DeLaurier et al. | |
| 2019/0102301 | A1* | 4/2019 | Li | G06F 12/0811 |
| 2019/0155731 | A1 | 5/2019 | Hagersten et al. | |
| 2019/0251029 | A1* | 8/2019 | Steinmacher-Burow | |
| | | | | G06F 12/0817 |
| 2019/0303576 | A1* | 10/2019 | Masputra | H04L 49/9052 |
| 2020/0159664 | A1 | 5/2020 | Lai et al. | |
| 2020/0210343 | A1 | 7/2020 | Tomei et al. | |
| 2020/0364144 | A1* | 11/2020 | Hagersten | G06F 12/0864 |
| 2020/0394458 | A1 | 12/2020 | Yu et al. | |
| 2021/0011646 | A1 | 1/2021 | Nystad et al. | |
| 2021/0191869 | A1 | 6/2021 | SeyedzadehDelcheh et al. | |
| 2021/0191872 | A1 | 6/2021 | Appu et al. | |
| 2021/0216455 | A1 | 7/2021 | Uhrenholt et al. | |
| 2021/0216464 | A1 | 7/2021 | Uhrenholt et al. | |
| 2021/0224189 | A1* | 7/2021 | Liu | G06F 12/0813 |
| 2021/0397560 | A1* | 12/2021 | Pardo | G06F 12/0817 |
| 2022/0027283 | A1* | 1/2022 | Uhrenholt | G06F 12/0895 |
| 2022/0091991 | A1* | 3/2022 | Bhargava | G06F 12/0813 |
| 2022/0141542 | A1* | 5/2022 | Stevens | H04N 21/26616 |
| | | | | 725/116 |

FOREIGN PATENT DOCUMENTS

| | | | | |
|---|---|---|---|---|
| GB | 2583020 | A * | 10/2020 | H04L 12/18 |
| WO | 2020190813 | | 9/2020 | |

OTHER PUBLICATIONS

M. Tomasevic and V. Milutinovic, "Hardware approaches to cache coherence in shared-memory multiprocessors, Part 1," in IEEE Micro, vol. 14, No. 5, pp. 52-, Oct. 1994.*

S. Min, M. Alian, W.-M. Hwu and N. S. Kim, "Semi-Coherent DMA: An Alternative I/O Coherency Management for Embedded Systems," in IEEE Computer Architecture Letters, vol. 17, No. 2, pp. 221-224, Jul. 1-Dec. 2018.*

J. L. Abellán, A. Ros, J. Fernández and M. E. Acacio, "ECONO: Express coherence notifications for efficient cache coherency in many-core CMPs," 2013 International Conference on Embedded Computer Systems: Architectures, Modeling, and Simulation (SAMOS), Agios Konstantinos, Greece, 2013, pp. 237-244.*

A. García-Guirado, R. Fernández-Pascual and J. M. García, "ICCI: In-Cache Coherence Information," in IEEE Transactions on Computers, vol. 64, No. 4, pp. 995-1014, Apr. 2015.*

Uhrenholt "Cache Systems", U.S. Appl. No. 18/446,535, filed Aug. 9, 2023.

Combined Search and Examination Report dated May 2, 2023, GB Patent Application No. GB2212738.5.

Combined Search and Examination Report dated Jul. 19, 2022, GB Patent Application No. GB2118624.2.

Combined Search and Examination Report dated Aug. 2, 2022, GB Patent Application No. GB2118626.7.

Combined Search and Examination Report dated Aug. 2, 2022, GB Patent Application No. 2118631.7.

Seiler, Larry et al., "Automatic GPU Data Compression and Address Swizzling for CPUs via Modified Virtual Address Translation", Symposium on Interactive 3D Graphics and Games, 2020, pp. 1-10.

Alameldeen Alaa R. et al., "Adaptive Cache Compression for High-Performance Processors", ACM Sigarch Computer Architecture News, vol. 32, Issue 32, Mar. 2004.

Park, Jaehyun et al., "HoPE: Hot-Cacheline Prediction for Dynamic Early Decompression in Compressed LLCs", ACM Transactions on Design Automation of Electronic Systems, vol. 22, Issue 3, Jul. 2017, pp. 1-25.

Uhrenholt et al., "Cache Systems," U.S. Appl. No. 18/064,020, filed Dec. 9, 2022.

Uhrenholt "Cache Systems," U.S. Appl. No. 18/064,044, filed Dec. 9, 2022.

Non-Final Office Action dated Feb. 14, 2024, U.S. Appl. No. 18/064,044, 24 pages.

Non-Final Office Action dated Mar. 28, 2024, U.S. Appl. No. 18/064,020, 50 pages.

Response to Non-Final Office Action dated Apr. 26, 2024, U.S. Appl. No. 18/064,044, 8 pages.

Examination Report dated Apr. 30, 2024, GB Patent Application No. GB2118624.2, 3 pages.

Response to Non-Final Office Action dated Jun. 26, 2024, U.S. Appl. No. 18/064,020, 11 pages.

Notice of Allowance dated Jul. 8, 2024, U.S. Appl. No. 18/064,044, 19 pages.

Final Office Action dated Nov. 4, 2024, U.S. Appl. No. 18/064,020, 43 pages.

Non-Final Office Action dated Dec. 30, 2024, U.S. Appl. No. 18/446,535, 49 pages.

Response to Final Office Action dated Jan. 31, 2025, U.S. Appl. No. 18/064,020, 11 pages.

Response to Non-Final Office Action dated Jan. 31, 2025, U.S. Appl. No. 18/446,535, 12 pages.

Notice of Allowance dated Feb. 26, 2025, U.S. Appl. No. 18/064,020, 19 pages.

Notice of Allowance dated Mar. 19, 2025, U.S. Appl. No. 18/446,535, 17 pages.

* cited by examiner

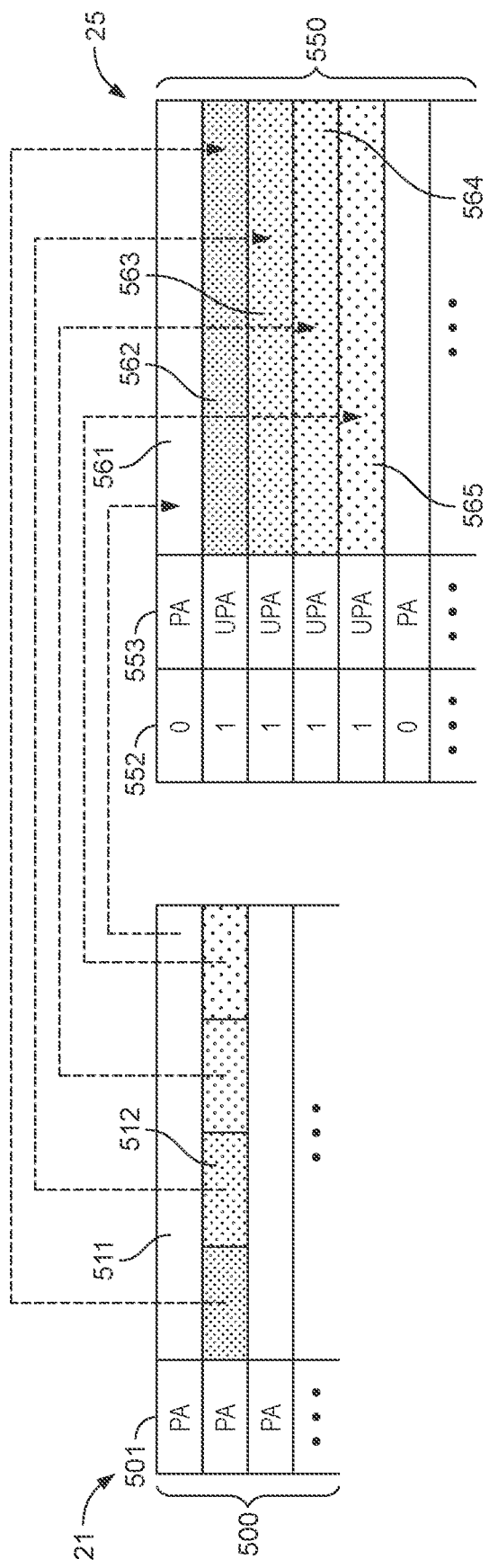
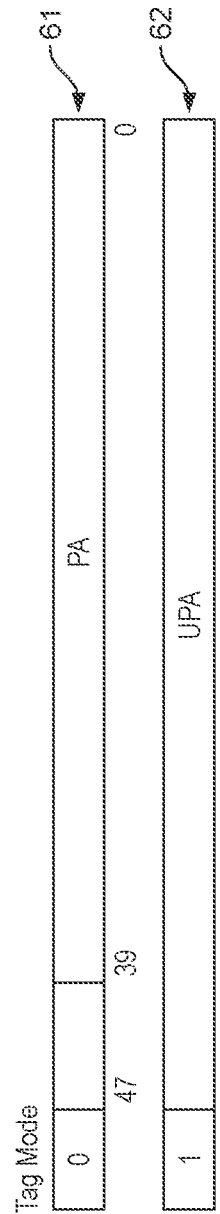
FIG. 6A
FIG. 6B

CACHE SYSTEMS

CROSS-REFERENCE TO RELATED APPLICATIONS

This application claims priority pursuant to 35 U.S.C. 119(a) to British Applications No. 2118624.2, 2118626.7, 2118631.7, filed Dec. 21, 2021, which applications are incorporated herein by reference in their entirety.

BACKGROUND

The technology described herein relates to cache systems and in particular to cache operations in data processing systems, such as a graphics processing system.

In data processing systems, to assist with storing data locally to a processor while data processing operations using the data are being performed, a cache system may be used. This can help to reduce the need to fetch data from slower data stores, such as main memory of the data processing system.

A cache system may include multiple caches that cache the same data. Consequently, a cache coherence protocol may be implemented to ensure cache coherence. In such a protocol, updating a cache entry (e.g. cache line) in one cache will typically trigger an update to (e.g. invalidation of) a corresponding cache entry associated with the same address (e.g. tag) in another cache or caches.

The Applicants believe that there remains scope for improvements to cache operations in data processing systems, such as graphics processing systems.

BRIEF DESCRIPTION OF THE DRAWINGS

Embodiments of the technology described herein will now be described by way of example only and with reference to the accompanying drawings, in which:

FIG. 6A shows a cache system in accordance with an embodiment of the technology described herein;

FIG. 6B shows cache tags in accordance with an embodiment of the technology described herein;

Like reference numerals are used for like components where appropriate in the drawings.

DETAILED DESCRIPTION

Figure 1:
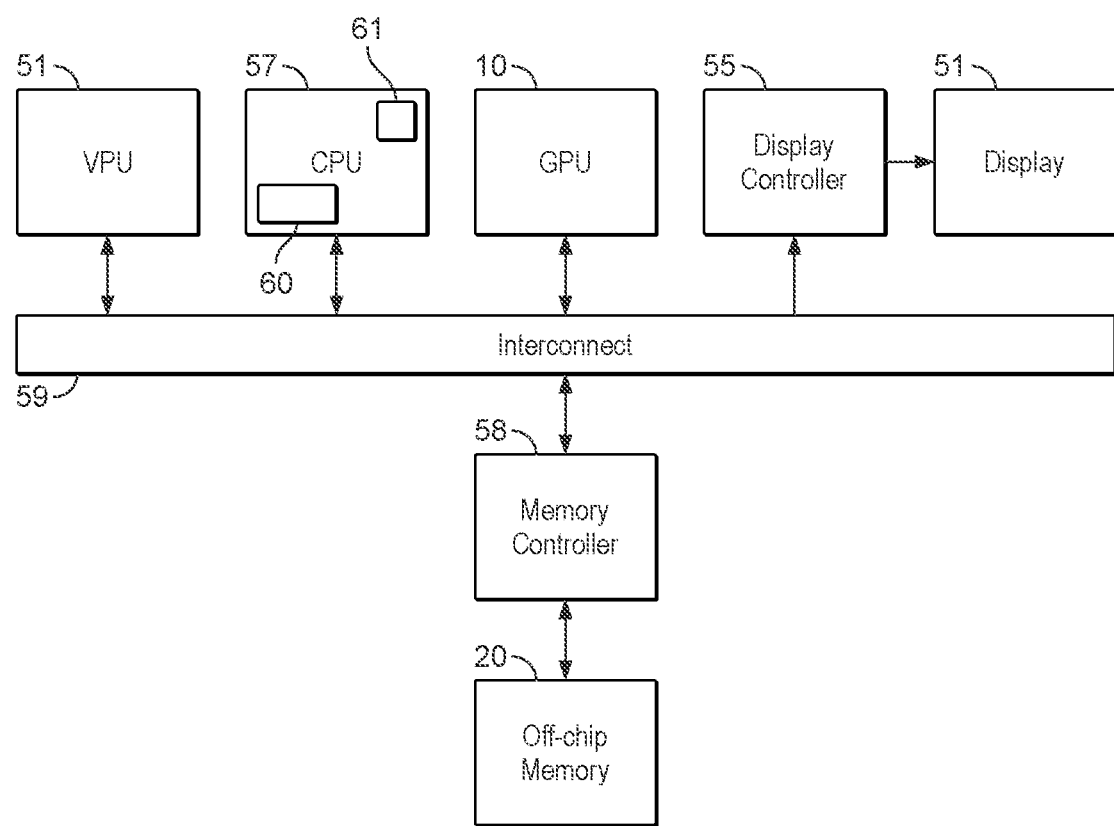
FIG. 1 shows a graphics processing system that may be operated in accordance with an embodiment of the technology described herein.

A first embodiment of the technology described herein comprises a method of operating a cache system that comprises a cache operable to cache data stored in memory for a processor; the method comprising: for a cache entry in the cache that caches payload data that is associated with header data that is cached by another cache entry in the cache: maintaining information indicating a link between the cache entry that caches the payload data and the another cache entry that caches the header data.

A second embodiment of the technology described herein comprises a cache system comprising: a cache operable to cache data stored in memory for a processor; and a link maintaining circuit configured to, for a cache entry in the cache that caches payload data that is associated with header data that is cached by another cache entry in the cache: maintain information indicating a link between the cache entry that caches the payload data and the another cache entry that caches the header data.

The technology described herein relates to a cache system that includes at least one cache that caches data stored in memory for a processor. In embodiments, (at least part of) the cache system forms part of the processor. Thus, embodiments of the technology described herein relate to a (data) processor, such as a graphics processor, that comprises the cache system. In embodiments, the cache system forms part of a data processing system that comprises the (data) processor and the memory. Thus, embodiments of the technology described herein relate to a data processing system, such as a graphics processing system, that includes a cache system including a cache that caches data stored in a memory system of the data processing system for a processor of the data processing system. The processor may thus be, and in an embodiment is, operable to receive data from the memory system by reading from the cache, and/or to send data to the memory system by writing to the cache.

The technology described herein relates to the situation in which a cache of a cache system is caching associated header and payload data in different cache entries (e.g. cache lines).

For example, and in an embodiment, and as will be discussed in more detail below, the system may be operable to encode an array of data elements by encoding smaller blocks or regions (i.e. compression blocks) of data elements that the array has been divided into, with each compression block being encoded as a (respective) header and associated payload data. In this case, the header and associated payload data for a compression block may be cached by the cache system in different cache entries, typically with the payload data occupying a greater number of cache entries than the header data.

In the technology described herein, the (link maintaining circuit of the) cache system maintains information that links a (and in an embodiment each) cache entry (e.g. cache line) in the cache that is caching payload data to the cache entry (e.g. cache line) in the cache that is caching the associated header data. The link information may thus indicate, for a (and in an embodiment each) cache entry that is caching payload data, which cache entry is caching the associated header data, and/or for a (and in an embodiment each) cache entry that is caching header data, which cache entry is caching associated payload data.

The link information can thus provide an indication that different cache entries (e.g. cache lines) in the same cache are linked, due to the cache entries caching associated header and payload data, e.g. and in an embodiment, for the same compression block.

The Applicants have found that maintaining such link information can facilitate a significant reduction in bandwidth requirements associated with maintaining cache coherence. In particular, and as will be discussed in more detail below, the link information can facilitate a significant reduction in the number of coherency transactions required to maintain cache coherence, by limiting such transactions to header cache entries and reducing or avoiding transactions in respect of payload cache entries (which, as mentioned above, there may typically be more of than header cache entries).

It will be appreciated, therefore, that the technology described herein can provide an improved cache system, data processor and data processing system.

The technology described herein can be used by and on any suitable processor, such as a central processing unit (CPU). In an embodiment, the technology described herein is used for a graphics processor (GPU), and so in an embodiment, the data processing system is a graphics processing system and the processor is a graphics processor (GPU). The processor may be a single or multi-cored data processor. Thus, the (e.g. graphics) processor in an embodiment comprises one or more programmable execution units (e.g. shader cores).

The memory (system) can comprise any suitable memory (of the data processing system), and may be configured in any suitable and desired manner. In embodiments, it is a main memory of the data processing system. In embodiments, it is a memory that is off chip from the processor, i.e. an external (main) memory (external to the processor).

The cache of the cache system in respect of which the link information is maintained (by the link maintaining circuit) can be any suitable cache of the cache system. In an embodiment, the cache is a cache that (a programmable execution unit (e.g. shader core) of) the (e.g. graphics) processor has (in an embodiment direct) access to. Thus, the cache is in an embodiment a cache that is local to (a programmable execution unit (e.g. shader core) of) the processor.

Thus, in an embodiment, (a programmable execution unit (e.g. shader core) of) the processor is operable to receive data from the memory system by reading (directly) from the cache. Correspondingly, (a programmable execution unit (e.g. shader core) of) the processor is in an embodiment operable to send data to the memory system by writing data (directly) to the cache, with the written data then being (potentially) written back to the memory system by the cache system appropriately.

The cache may be a cache that (a programmable execution unit (e.g. shader core) of) the processor can read from and write to, such as a load/store cache. In an embodiment, the cache is a cache that (a programmable execution unit (e.g. shader core) of) the processor can read from but not write to, such as a texture cache. The (e.g. graphics) processor may thus (further) comprise a texture mapper circuit that is operable to receive (e.g. texture) data from the memory system by reading (directly) from the texture cache.

The cache system may be a single level cache system, but in an embodiment is a multi-level cache system. In this case, in an embodiment, the cache in respect of which the link information is maintained (by the link maintaining circuit) is a lower level cache, and the cache system further comprises a higher level cache.

For example, and in an embodiment, the cache in respect of which the link information is maintained is a level 1 (L1) cache, and the cache system in an embodiment further comprises a level 2 (L2) cache (logically) in between the memory system and the L1 cache. Other levels of the cache system would be possible. For example, the cache system could comprise a level 0 (L0) and/or level 3 (L3) cache.

It will be appreciated here that a lower level cache will be (logically) closer to (a programmable execution unit (e.g. shader core) of) the processor, whereas a higher level cache will be (logically) closer to the memory system. In an embodiment, a higher level cache caches data stored in the memory system, and a lower level cache caches data cached by the higher level cache.

The system could include only one processor and corresponding (lower level) cache. Alternatively, the data processing system could comprise plural processors, with each processor in an embodiment having its own respective local (lower level, e.g. L1) cache.

In an embodiment, the processor is a multi-cored data processor. Thus, the (e.g. graphics) processor in an embodiment comprises plural programmable execution units (e.g. shader cores), that may each be operable to execute (e.g. shader) programs. In this case, each programmable execution unit of the (e.g. graphics) processor is in an embodiment associated with (has access to) its own respective (lower level, e.g. L1) cache.

Thus, in an embodiment, the cache system comprises plural (lower level) caches, for each of which link information is maintained in the manner of the technology described herein. In this case, link information may be maintained for plural (lower level) caches by the same link maintaining circuit, or there may be a respective link maintaining circuit for each of the plural (lower level) caches. In an embodiment, each of the plural (lower level, e.g. load/store and/or texture) caches can communicate with the (same) higher level (e.g. L2) cache.

A (and in an embodiment each) cache of the cache system should, and in an embodiment does, comprise a respective set of cache entries, such as and in an embodiment, a respective set of cache lines. Each cache entry (e.g. cache line) in the cache system in an embodiment has the same (fixed) size, such as 16 bytes, 32 bytes, 64 bytes, 128 bytes, 256 bytes, etc. A (and in an embodiment each) cache entry (e.g. cache line) should, and in an embodiment does, include respective data that the cache entry caches, and in an embodiment an identifier (e.g. tag) for the data, that in an embodiment indicates a location (address) in the memory system where corresponding data is stored. A (and in an embodiment each) cache entry (e.g. cache line) in an embodiment further comprises state information indicating a status of the cache entry, such as, and in an embodiment, whether the respective data is valid or invalid, and/or whether or not the respective data is "dirty", and/or whether or not the respective data is cached by another cache of the cache system (i.e. whether the data is "shared" or "unique"), etc.

As discussed above, the technology described herein relates to the situation in which a (in an embodiment lower level) cache is caching associated header and payload data. Thus, payload data is in an embodiment stored in the memory system in association with a header.

Payload data should, and in an embodiment does, comprise data of interest, such as image data, such as texture data, that the processor operates on. Header data should, and in an embodiment does, comprise metadata associated with payload data that provides information about one or more aspects of the payload data. For example, header data may include information that is needed in order to be able to access the associated payload data. Thus, reading payload data in an embodiment involves first reading and using the associated header data (and correspondingly, writing payload data in an embodiment involves updating (writing) the associated header data). A header may, for example, include memory address information that can be used to determine a memory address in the memory system at which the payload data is stored.

In an embodiment, payload data is stored in the memory system in compressed form, and associated header data is stored in the memory system in uncompressed form. The associated header data then in an embodiment includes compression information that is read as part of the payload decompression process, and that is written as part of the payload compression process. The compression information may, for example, and in an embodiment, indicate a compression scheme, and/or a compression ratio, etc., that was used when compressing the associated compressed payload data. In the case of block-based compression, the compression information may indicate a location (memory address) in the memory system for a (each) compression block.

In the case of payload data being stored in the memory system in compressed form, in an embodiment, the cache system is operable to provide compressed payload data to the processor in decompressed form. Thus, in an embodiment, in order to cache compressed payload data stored in the memory system, the (and in an embodiment each lower level) cache stores corresponding decompressed data in one or more cache entries. In an embodiment, in order to cache uncompressed header data stored in the memory system, the (and in an embodiment each lower level) cache stores corresponding uncompressed header data in one or more cache entries. Thus, the (and in an embodiment each lower level) cache is in an embodiment operable to cache uncompressed header data in uncompressed form, and to cache compressed payload data in decompressed (uncompressed) form.

Thus, in an embodiment, (a programmable execution unit (e.g. shader core) of) the processor is operable to receive header data that is stored in the memory system in uncompressed form by reading corresponding uncompressed data from the (lower level) cache, and to write header data in uncompressed form to the (lower level) cache, with the written header data then being (potentially) written back to the memory system in uncompressed form.

In an embodiment, (a programmable execution unit (e.g. shader core) of) the processor is (further) operable to receive payload data that is stored the memory system in compressed form by reading corresponding decompressed data from the (lower level) cache, and to write payload data in uncompressed ("to be compressed") form to the (lower level) cache, with the written payload data then (potentially) being (compressed and) written back to the memory system in compressed form.

To facilitate this, in an embodiment, the system comprises a compression codec, e.g. and in an embodiment a decoder and an encoder.

Thus, in an embodiment, (a programmable execution unit (e.g. shader core) of) the processor is operable to receive payload data that is stored the memory system in compressed form by reading corresponding decompressed payload data from the (lower level) cache that has been decompressed by the decoder, and to write payload data in "to be compressed" (uncompressed) form to the (lower level) cache, with the written payload data then being (potentially) compressed by the encoder and written back to the memory system in compressed form.

Any suitable and desired compression codec (decoder and encoder) that implements any suitable and desired compression scheme may be used. As already mentioned, the compression scheme is in an embodiment a block-based compression scheme. Thus, the compression codec (decoder and encoder) is in an embodiment configured to decode and encode sets of data elements on a block by block basis. An array of data elements (e.g. corresponding to an image or texture) may be, in effect, divided into plural separate blocks or regions (i.e. compression blocks), and one or more encoded (i.e. compressed) blocks of data (comprising header and associated payload data) may be generated in respect of each different block or region (i.e. compression block) that the array of data elements is divided into. A block-based compression scheme may allow each block to be separately accessed and modified, for example.

The compression blocks (regions) that the data array is divided into for encoding purposes can take any suitable and desired form. Each compression block may comprise a sub-set of the data elements (positions) in the array, i.e. correspond to a particular region of the array. In an embodiment the array is divided into non-overlapping and regularly sized and shaped (compression) blocks. The (compression) blocks are in an embodiment square, but other arrangements could be used if desired.

In an embodiment, the data array is divided into 16×16 (compression) blocks (i.e. (compression) blocks of 16×16 array positions (entries)). In one such arrangement, a single encoded (compressed) block is generated for each 16×16 (compression) block. Thus, in the case of a texture map, for example, a separate encoded block would be generated for each (non-overlapping) 16×16 texel region (compression block) of the texture map, and in the case of an image or a frame, an encoded block would be generated for each 16×16 pixel or sampling position region (compression block) of the image or frame.

Other arrangements would be possible. For example, instead of generating a single encoded block for a e.g. 16×16 (compression) block, plural, such as four, encoded blocks, each representing e.g. an 8×8 or a 16×4 block within the e.g. 16×16 (compression) block could be generated (in effect therefore, the data array would be divided into 8×8 or 16×4 blocks).

The compression scheme may encode data in a lossless or lossy manner. For example, Arm Frame Buffer Compression (AFBC), e.g. as described in US 2013/0036290 and US 2013/0198485, the entire contents of which is hereby incorporated by reference, may be used. Alternatively, Arm Fixed Rate Compression (AFRC), e.g. as described in WO 2020/115471, the entire contents of which is hereby incorporated by reference, may be used. Other, e.g. block-based, compression schemes would be possible.

Thus, in an embodiment, the cache system is operable to cache compression block data. That is, the cache system in an embodiment caches compressed (e.g. image, e.g. texture) data comprising one or more sets of compressed data, with each set of compressed data in an embodiment comprising data for a respective set of one or more blocks of a data array that the compressed data represents. In this case, associated header and payload data in an embodiment comprises data for the same compression block.

Thus, in an embodiment, header data for a compression block is cached in the cache system in a (e.g. single) cache entry, and payload data for the (same) compression block is cached in the cache system in one or more other (e.g. plural) associated cache entries.

In an embodiment, a (and each) compression block (when uncompressed) corresponds to an integer number of cache entries of the cache system, e.g. 4 or 8 cache lines. (Thus, for example, in the case of 64 byte cache entries, each compression block in its uncompressed form may, e.g., comprise and be stored as a 256 or 512 byte block of data.)

The compression codec (decoder and encoder) could be (logically) between the memory system and the cache system, e.g. such that compressed payload data from the memory system is decompressed before being stored in the cache system, and such that "to be compressed" (uncompressed) payload data in the cache system is compressed at the point when it is to be written back to the memory system.

However, in an embodiment, the compression codec (decoder and encoder) is provided (logically) between the (lower level) cache in respect of which the link information is maintained and a (the) higher level cache of the cache system.

Thus, in an embodiment, the cache system comprises a (the) compression codec (decoder and encoder) (logically) between the (lower level) cache and a (the) higher level cache.

In this case, in an embodiment, the higher level cache is operable to cache (store) uncompressed header data in uncompressed form, and compressed payload data in compressed form. The (lower level) cache in respect of which the link information is maintained is then in an embodiment operable to cache (store) uncompressed header data that is cached in the higher level cache in uncompressed form, and to cache (store) compressed payload data that is cached in the higher level cache in decompressed (uncompressed) form. That is, higher level cache entries in an embodiment comprise compressed payload data and uncompressed header data, and lower level cache entries in an embodiment comprise decompressed (uncompressed) payload data (that in an embodiment has been decompressed by the decoder and/or is to be compressed by the encoder) and uncompressed header data.

As discussed above, in the technology described herein, link information is maintained (by a link maintaining circuit) that can indicate links between cache entries in the (and in an embodiment each lower level) cache that cache associated header and payload data. The link information can take any suitable and desired form.

The link information for a (and in an embodiment each lower level) cache may comprise, for each cache entry in the cache that caches payload data that is associated with header data that is cached by another cache entry in the cache, a link between the respective cache entry and the respective another cache entry.

In an embodiment, the link information comprises one or more indicators, with each indicator indicating a pair of linked cache entries in a (lower level) cache. A (and in an embodiment each) indicator is in an embodiment a pointer that points between linked cache entries. A pointer may point from a cache entry that caches header data to a cache entry that caches associated payload data, but in an embodiment points from a cache entry that caches payload data to a cache entry that caches associated header data.

Thus, in an embodiment, a (and in an embodiment each) (lower level) cache entry has associated with it, and in an embodiment includes, an indicator, such as a pointer, that can indicate (e.g. point to) an associated (e.g. header) cache entry.

In an embodiment, where a cache entry in a cache is not associated with any other cache entry in the cache, the respective indicator does not indicate another cache entry. For example, a pointer may not point to another cache entry (may be "null").

The link information can be maintained (by the link maintaining circuit) in any suitable and desired manner. The link information should be, and in an embodiment is, updated (maintained) (by the link maintaining circuit) such that it indicates links in respect of current cache entries. The link information is in an embodiment updated appropriately (by the link maintaining circuit) when data is read into a (the) cache, and in an embodiment when data is evicted from a (the) cache.

The link maintaining circuit is thus in an embodiment operable to, when data is read into, or evicted from, a cache entry of the cache, update the link information (e.g. pointer) for the cache entry appropriately.

The link information (e.g. pointer) may be generated, e.g. by the link maintaining circuit, the cache or by the encoder. In an embodiment, the decoder generates the link information (e.g. pointer) when decoding compressed data that is to be written to a (the) cache in decompressed form (and provides the information to the link maintaining circuit as appropriate).

In an embodiment, header data is read into a first cache entry in the (lower level) cache, associated payload data is read into a second cache entry in the (lower level) cache, in an embodiment using the header data, and the link information is in an embodiment updated (by the link maintaining circuit), e.g., to indicate that the first cache entry caches the header data that the payload data that the second cache entry caches is associated with.

Caches of the cache system should be, and in an embodiment are, coherent caches, i.e. caches that the cache system maintains coherently. Thus, where a first cache of the cache system includes an entry (e.g. cache line) that is validly caching data, and a second cache of the cache system includes a corresponding entry that is associated with same identifier (e.g. tag) and is validly caching the same data, an update (e.g. write) to the entry in the first cache should be, and in an embodiment is, accompanied by a corresponding update to the corresponding entry in the second cache. The update to the corresponding entry in the second cache may comprise, for example, updating the data of the corresponding entry in the second cache so that both entries validly cache the same updated data, or invalidating the corresponding entry in the second cache (i.e. updating the state information of the corresponding entry in the second cache to indicate that the data is invalid) so that only the updated entry in the first cache remains valid.

In order to maintain such cache coherence, the system in an embodiment keeps track of which cache is caching what data. Thus, in an embodiment, the cache system maintains (further) coherency information that indicates what data is cached by a, and in an embodiment each, cache of the cache system. When data is read into a cache, the coherency information may be updated to indicate that the read in data is now cached by that cache. Correspondingly, when data is evicted from a cache, the coherency information may be updated to indicate that the evicted data is not cached by that cache. The coherency information may then be used e.g. to determine what (if any) cache entry updates to trigger in response to a cache entry update.

The coherency information can be provided in any suitable manner. In an embodiment, the coherency information is provided in the form of a coherency directory. The coherency information (e.g. directory) is in an embodiment maintained separately from the link information. For example, and in an embodiment, the higher level (e.g. L2) cache maintains the coherency information (e.g. directory), whereas the link information is maintained at the lower (e.g. L1) level (by the link maintaining circuit), in an embodiment in association with the (respective) lower level cache (e.g. as described above).

In an embodiment, the coherency information (e.g. directory) keeps track of which caches are caching header cache entries, but omits keeping track of (does not keep track of) which caches are caching payload cache entries. Cache coherence in respect of payload cache entries is then in an embodiment maintained using the link information. The Applicants have found that this arrangement can reduce the number of cache coherency transactions that access the coherency information (e.g. directory), thereby reducing bandwidth requirements, while still allowing cache coherence to be maintained.

Thus, coherency information that indicates what header data is cached by the cache is in an embodiment maintained, and coherency information that indicates what payload data is cached by the cache is in an embodiment not maintained (at least in respect of those cache entries for which link information is maintained (by the link maintaining circuit)). The coherency information (e.g. directory) may include coherency information in respect of payload data which is not updated (maintained), or the coherency information (e.g. directory) may simply not include any coherency information in respect of payload data.

Thus, when header data is read into a (the) cache, the coherency information is in an embodiment updated to indicate that the cache caches the header data. Similarly, when header data is evicted from a (the) cache, the coherency information is in an embodiment updated to indicate that the cache does not cache the header data.

In contrast, in an embodiment, when payload data is read into a (the) cache, updating the coherency information to indicate that the cache caches the payload data is omitted (is not done). Similarly, when payload data is evicted from a (the) cache, updating the coherency information to indicate that the cache does not cache the payload data is in an embodiment omitted (is not done).

Cache coherence in respect of payload cache entries can be maintained using the link information in any suitable and desired manner. In an embodiment, the cache system is configured to invalidate a payload cache entry that the link information indicates is associated with a header cache entry, in response to invalidation of the header cache.

Thus, in an embodiment, in response to invalidation of a cache entry in the cache that caches header data, the link information is used to invalidate any (and in an embodiment all) cache entries in the (same) cache that cache payload data that is (indicated by the link information as being) associated with the header data.

A cache entry that caches header data may be invalidated, for example and in an embodiment, when evicting the cache entry that caches the header data from the cache, or in response to a (e.g. "snoop") request to invalidate the cache entry that caches the header data. Such a (e.g. "snoop") request can, and in an embodiment does, originate from another (e.g. lower level) cache of the cache system, e.g. and in an embodiment, in response to an update (e.g. write) to a cache entry of the another cache (that in an embodiment caches data for the same compression block).

A payload cache entry can be invalidated using the link information in any suitable and desired manner. Invalidating a payload cache entry using the link information in an embodiment does not involve accessing the coherency information. A reduction in coherency traffic, e.g. and in an embodiment, between the higher level cache which in an embodiment maintains the coherency information and the (lower level) cache, can thereby be facilitated.

Thus, in an embodiment, in response to invalidation of a cache entry in the (lower level) cache that caches header data, the link information (that is in an embodiment maintained (by the link maintaining circuit) at the lower level) is used to invalidate any (and in an embodiment all) cache entries in the (lower level) cache that cache payload data that is (indicated by the link information as being) associated with the header data without accessing the coherency information (that is in an embodiment maintained at a different, in an embodiment higher, level of the cache system).

Invalidation of a header cache entry could trigger immediate invalidation of a linked payload cache entry. However, in some situations, such as where a payload cache entry is locked, this may not be possible. To account for this, in an embodiment, in response to invalidation of a cache entry in a cache that caches header data, invalidation of a (and in an embodiment each) cache entry in the cache that caches associated payload data is deferred.

This can be achieved as desired. In an embodiment, in response to invalidation of a cache entry in a cache that caches header data, a (and in an embodiment each) cache entry in the cache that caches associated payload data is marked as "deferred invalidate". The cache system is then configured to attempt to invalidate a cache line that is marked as "deferred invalidate" as soon as possible, e.g. and in an embodiment, once a lock is released. The cache system is in an embodiment moreover configured such that a cache entry that is marked as "deferred invalidate" cannot be accessed by the processor. For example, a cache entry that is marked as "deferred invalidate" in an embodiment cannot return a cache "hit".

The technology described herein can be implemented in any suitable system, such as a suitably configured microprocessor based system. In an embodiment, the technology described herein is implemented in a computer and/or micro-processor based system. The technology described herein is in an embodiment implemented in a portable device, such as, and in an embodiment, a mobile phone or tablet.

The technology described herein is applicable to any suitable form or configuration of processor and data processing system, such as graphics processors (and systems) having a "pipelined" arrangement (in which case the graphics processor comprises a rendering pipeline). It may be applicable, for example, to tile-based graphics processors and graphics processing systems. Thus the processor may be a tile-based graphics processor.

In an embodiment, the various functions of the technology described herein are carried out on a single data processing platform that generates and outputs data, for example for a display device.

As will be appreciated by those skilled in the art, the data (e.g. graphics) processing system may include, e.g., and in an embodiment, a host processor that, e.g., executes applications that require processing by the data (e.g. graphics) processor. The host processor will send appropriate commands and data to the data (e.g. graphics) processor to control it to perform data (e.g. graphics) processing operations and to produce data (e.g. graphics) processing output required by applications executing on the host processor. To facilitate this, the host processor should, and in an embodiment does, also execute a driver for the processor and optionally a compiler or compilers for compiling (e.g. shader) programs to be executed by (e.g. a programmable execution unit of) the processor.

The processor may also comprise, and/or be in communication with, one or more memories and/or memory devices that store the data described herein, and/or store software (e.g. (shader) program) for performing the processes described herein. The processor may also be in communication with a host microprocessor, and/or with a display for displaying images based on data generated by the processor.

The technology described herein can be used for all forms of input and/or output that a data (e.g. graphics) processor may use or generate. For example, the data (e.g. graphics) processor may execute a graphics processing pipeline that generates frames for display, render-to-texture outputs, etc. The output data values from the processing are in an embodiment exported to external, e.g. main, memory, for storage and use, such as to a frame buffer for a display.

The various functions of the technology described herein can be carried out in any desired and suitable manner. For example, the functions of the technology described herein can be implemented in hardware or software, as desired. Thus, for example, the various functional elements, stages, and "means" of the technology described herein may comprise a suitable processor or processors, controller or controllers, functional units, circuitry, circuit(s), processing logic, microprocessor arrangements, etc., that are operable to perform the various functions, etc., such as appropriately dedicated hardware elements (processing circuit(s)) and/or programmable hardware elements (processing circuit(s)) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuit(s), etc., if desired.

Furthermore, any one or more or all of the processing stages of the technology described herein may be embodied as processing stage circuitry/circuits, e.g., in the form of one or more fixed-function units (hardware) (processing circuitry/circuits), and/or in the form of programmable processing circuitry/circuits that can be programmed to perform the desired operation. Equally, any one or more of the processing stages and processing stage circuitry/circuits of the technology described herein may be provided as a separate circuit element to any one or more of the other processing stages or processing stage circuitry/circuits, and/or any one or more or all of the processing stages and processing stage circuitry/circuits may be at least partially formed of shared processing circuitry/circuits.

Subject to any hardware necessary to carry out the specific functions discussed above, the components of the data processing system can otherwise include any one or more or all of the usual functional units, etc., that such components include.

It will also be appreciated by those skilled in the art that all of the described embodiments of the technology described herein can include, as appropriate, any one or more or all of the optional features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc. . . .

The technology described herein also extends to a computer software carrier comprising such software which when used to operate a data processor, renderer or other system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

A number of embodiments of the technology described herein will now be described.

As discussed above, in embodiments of the technology described herein information indicating a link between a header cache entry an associated payload cache entry is maintained, and used to facilitate a reduction in cache coherence traffic.

FIG. 1 shows a graphics processing system that may operate in accordance with an embodiment.

The exemplary graphics processing system shown in FIG. 1 comprises a host processor comprising a central processing unit (CPU) 57, a graphics processor (graphics processing unit (GPU)) 10, a video processing unit (VPU) 51, and a display controller 55. As shown in FIG. 1, these processing units can communicate via an interconnect 59 and have access to an off-chip memory system (memory) 20 via the bus 59 and a memory controller 58. Other processing units may be provided.

In use of this system, the CPU 57, and/or VPU 51 and/or GPU 10 will generate frames (images) to be displayed, and the display controller 55 will provide frames to a display 51 for display. To do this the CPU 57, and/or VPU 51 and/or GPU 10 may read in data from the memory 20 via the interconnect 59, process that data, and return data to the memory 20 via the interconnect 59. The display controller 55 may then read in that data from the memory 20 via the interconnect 59 for display on the display 51.

For example, an application 60, such as a game, executing on the host processor (CPU) 57 may require the display of graphics processing unit rendered frames on the display 51. In this case, the application 60 will send appropriate commands and data to a driver 61 for the graphics processing unit 10 that is executing on the CPU 57. The driver 61 will then generate appropriate commands and data to cause the graphics processing unit 10 to render appropriate frames for display and store those frames in appropriate frame buffers in main memory 20. The display controller 55 will then read those frames into a buffer for the display from where they are then read out and displayed on the display panel of the display 51.

As part of this processing, the graphics processor 10 will read in data, such as textures, geometry to be rendered, etc. from the memory 20, process that data, and then return data to the memory 20 (e.g. in the form of processed textures and/or frames to be displayed), which data will then further, e.g. as discussed above, be read from the memory 20, e.g. by the display controller 55, for display on the display 51.

Thus, there will be a need to transfer data between the memory 20 and the graphics processor 10. In order to facilitate this, and to reduce the amount of data that needs to be transferred to and from memory during processing operations, the data may be stored in a compressed form in the memory 20.

As the graphics processor 10 will typically need to operate on the data in an uncompressed form, this accordingly means that data that is stored in the memory 20 in compressed form will need to be decompressed before being processed by the graphics processor 10. Correspondingly, data produced by the graphics processor 10 may need to be compressed before being stored in the memory 20.

Figure 2:
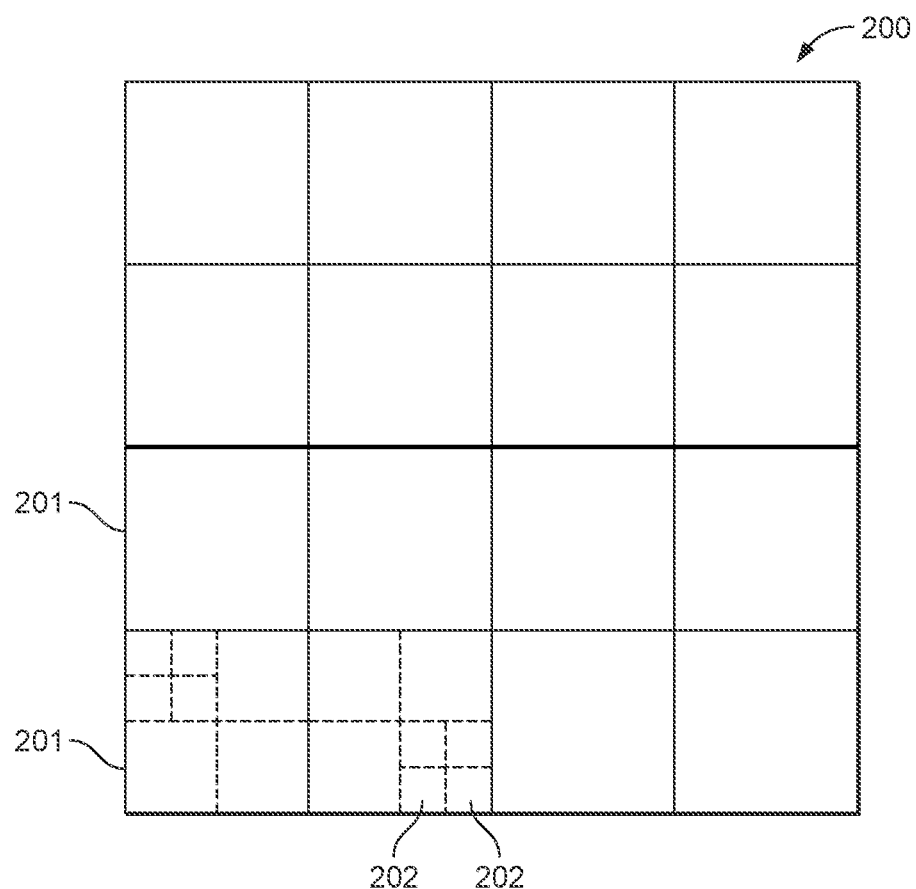
FIG. 2 shows a data array that may be processed in accordance with an embodiment of the technology described herein.

FIG. 2 shows schematically an exemplary data array 200 that may be generated and/or used by the graphics processor 10, and stored in the memory 20 in a compressed form, according to an embodiment.

The array of data 200 is a two-dimensional data array containing a plurality of data elements (i.e. containing data array entries at a plurality of particular positions within the array). The data array 200 could be any suitable and desired array of data, such as data representing an image.

In a graphics processing context, the data array 200 could, for example, be a texture map (i.e. an array of texture elements (texels)), or an array of data representing a frame to be displayed (in which case the data array may be an array of pixels to be displayed). In the case of a texture map, each data entry (position) in the data array will represent an appropriate texel value (e.g. a set of colour values, such as RGBA, or luminance and chrominance, values for the texel). In the case of a frame for display, each data entry (position) in the array will indicate a set of colour values (e.g. RGB values) to be used for displaying the frame on a display.

It will be appreciated, however, that the technology described herein extends to more general "compute" processing (rather than graphics processing per se), such as in accordance with the OpenCL or Vulkan APIs, or other forms of kernel execution. Thus, for example, in other embodiments the data array 200 is generated and/or used in compute processing.

In the present embodiments, the data array 200 is encoded and compressed to provide a set of data representing the data array 200 that is then stored in memory 20, and from which set of data, the data values of individual data elements in the data array 200 can be derived by decoding the data representing the data array 200.

In the present embodiments, as shown in FIG. 2, to encode and compress the data array 200, the data array 200 is first divided into a plurality of non-overlapping, equal size and uniform blocks 201, each block corresponding to a particular region of the data array 200. Each block 201 that the data array 200 is divided into is further sub-divided into a set of non-overlapping, uniform and equal-size sub-blocks 202.

In the present case, each block 201 corresponds to 16×16 elements (positions) within the data array 200 (i.e. a block of 16×16 texels in the case of a texture map), and each block 201 is divided into a set of sixteen sub-blocks 202. Each sub-block 202 accordingly corresponds to a 4×4 data element region within the block 201 (e.g. 4×4 texels in the texture map). Other arrangements would be possible.

The blocks 201 of the data array 200 are then encoded to provide a compressed representation of the blocks of the data array 200.

The encoding scheme that is used to encode blocks of the data array 200 can be any suitable block-based encoding scheme. The encoding scheme may encode the data in a lossless manner such that the original array of data elements can be perfectly reconstructed from the encoded data. For example, Arm Frame Buffer Compression (AFBC) may be used. In this case, the memory 20 may include a header buffer that stores a header data block for each block 201 that the data array 200 has been divided into, with each header data block including a pointer pointing to compressed sub-block 202 data for the respective block 201.

Alternatively, the encoding scheme may encode to fixed-size data packets. In this case, the compression into the fixed size data packets will be inherently 'lossy'.

For example, Arm Fixed Rate Compression (AFRC) may be used. In this case, respective sets of plural blocks may be grouped together with an associated "header" block, as a respective "page" of the memory system.

Figure 3:
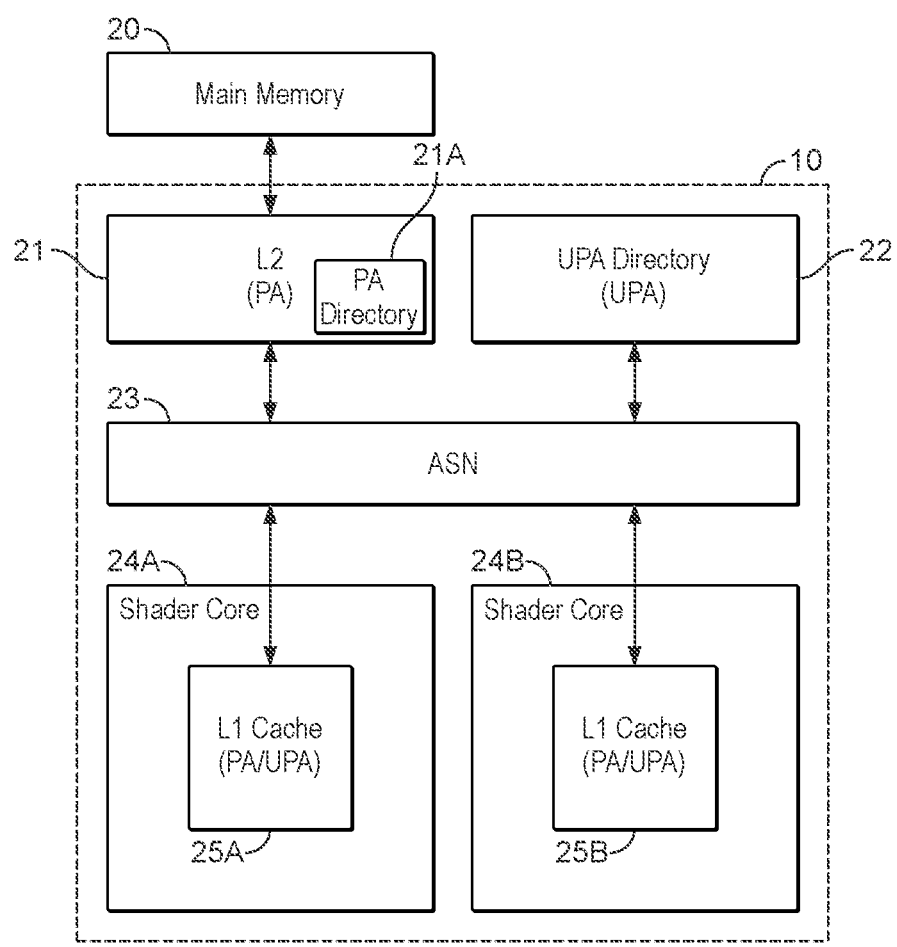
FIG. 3 shows a graphics processor in accordance with an embodiment of the technology described herein.
Figure 4:
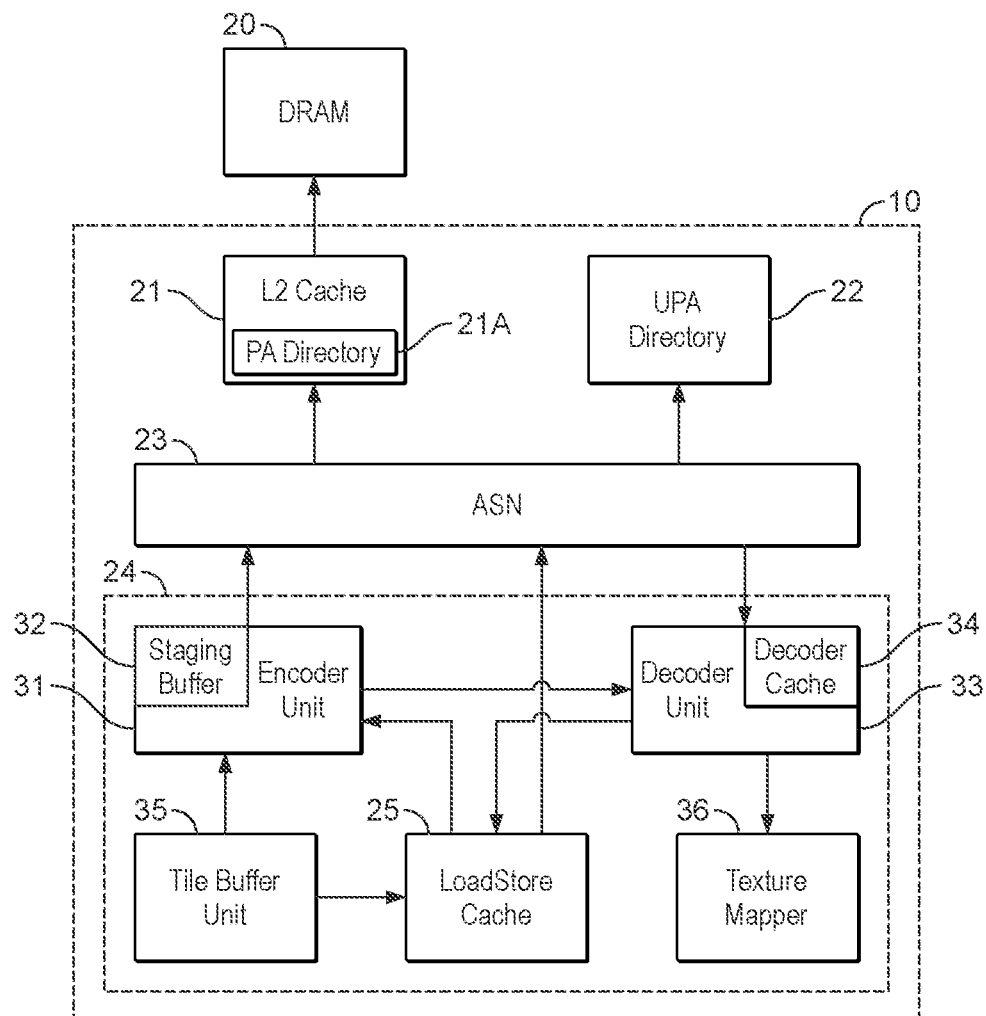
FIG. 4 shows a graphics processor in accordance with an embodiment of the technology described herein.
Figure 5:
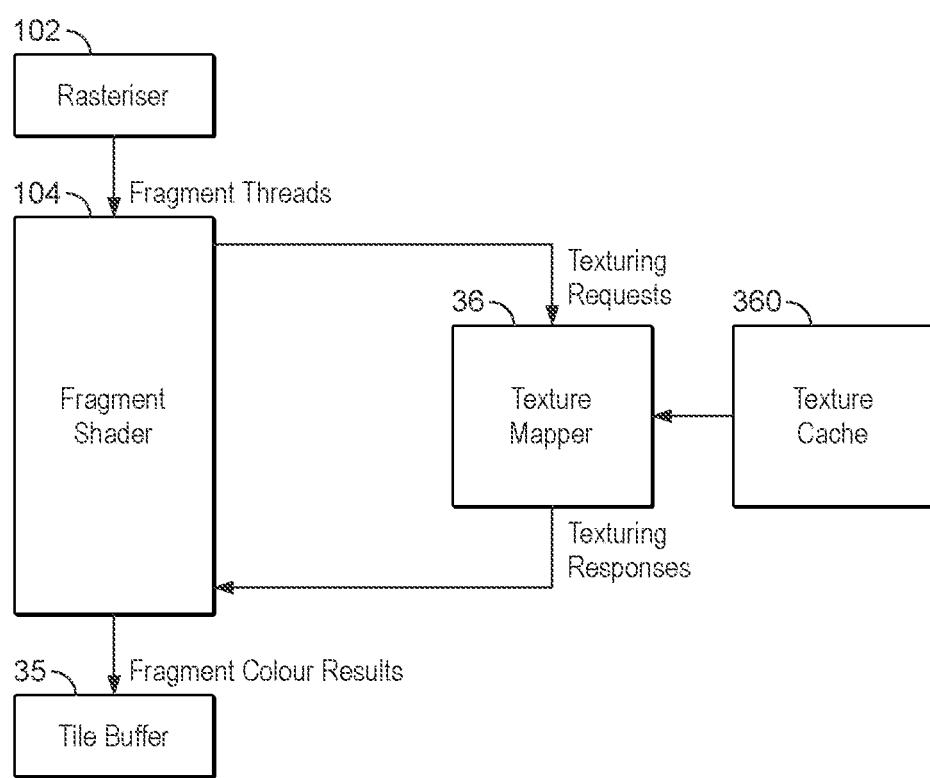
FIG. 5 shows a graphics processor in accordance with an embodiment of the technology described herein.

FIGS. 3, 4 and 5 show schematically elements of the graphics processor 10 of the system shown in FIG. 1 that are relevant to the operation of the present embodiments. As will be appreciated by those skilled in the art there may be other elements of the graphics processor 10 that are not shown in FIGS. 3, 4 and 5.

As shown in FIG. 3, the graphics processor 10 of the present embodiment includes plural processing cores (shader cores) 24A, 24B. FIG. 3 shows two shader cores 24A, 24B, but it will be appreciated that other numbers of shader cores are possible.

As shown in FIG. 3, the graphics processor 10 further includes a cache system that is operable to transfer data from the memory system 20 to the processing cores (shader cores) 24A, 24B of the graphics processor 10, and conversely to transfer data produced by the processing cores 24A, 24B of the graphics processor 10 back to the memory 20.

The cache system shown in FIG. 3 is illustrated as comprising two cache levels: an L2 cache 21 that is closer to the memory 20, and a respective L1 cache 25A, 25B associated with each shader core 24A, 24B of the graphics processor 10 (and from which the data is provided to the respective shader cores 24A, 24B). Other caches and cache levels would be possible. For example, an L3 cache may be provided in between the L2 cache 21 and memory system 20.

As shown in FIG. 3, in this embodiment data is transferred from the memory system 20 to an L1 cache 25A, 25B via the L2 cache 21, and from an L1 cache 25A, 25B to the respective shader core 24A, 24B (and vice-versa).

The graphics processor 10 also includes, as shown in FIG. 3, an appropriate interconnect 23 (in this case in the form of an asynchronous switch network (ASN)) for transferring data between the L2 cache 21 and the L1 caches 25A, 25B (shader cores 24A, 24B).

In the present embodiments, in order to facilitate the use of compressed data, compressed data received from the memory system 20 via the L2 cache 21 is decompressed before being stored in a decompressed form in an L1 cache 25A, 25B for use by the respective shader cores 24A, 24B, and, conversely, data that is to be evicted from an L1 cache 25A, 25B and to be stored in a compressed form is compressed prior to that data being written to the L2 cache 21. Thus, the cache system implements "cache-based compression". The arrangement in this regard is shown in more detail in FIG. 4.

FIG. 4 illustrates a single shader core 24 of the graphics processor 10 for clarity, but it will be appreciated that each shader core 24A, 24B may be arranged as illustrated in FIG. 4. As shown in FIG. 4, in the present embodiment, each shader core 24 includes a respective encoder 31, decoder 33, tile buffer unit 35, texture mapper 36 and Load/Store (L1) cache 25. In the present embodiment, the texture mapper 36 has a separate texture cache. As will be appreciated by those skilled in the art there may be other elements of the shader core 24 that are not shown in FIG. 4.

The decoder 33 is operable to decompress compressed data received from the memory system 20 via the L2 cache 21 before providing that data to be stored in decompressed form in the L1 cache 25 for use by the respective shader core 24. As shown in FIG. 4, in the present embodiment, the decoder 33 is further operable to decompress compressed texture data and provide that data to the texture cache of the texture mapper 36.

As shown in FIG. 4, the decoder 33 includes a decoder cache 34 for the temporary storage of data when performing a decoding operation.

Conversely, the encoder 31 is operable to compress data that is to be evicted from the L1 cache 25 before providing that data to be stored in a compressed form in the L2 cache 21. As shown in FIG. 4, in the present embodiment, the encoder 31 is further operable to compress data that is to be written out to memory 20 by the tile buffer unit 35.

As shown in FIG. 4, the encoder 31 includes a staging buffer 32 for the temporary storage of data when performing an encoding operation.

In the present embodiment, it is also possible for data to be stored in the memory 20 and L2 cache 21 in uncompressed form, and correspondingly transferred between the L1 cache 25 and the L2 cache 21 in uncompressed form. To facilitate this, as shown in FIG. 4, the L1 cache 25 can communicate with the L2 cache 21 via the interconnect 23, bypassing the encoder 31 and decoder 33.

Thus, in embodiments of the technology described herein, the L1 cache 25 can cache both data that is cached in the L2 cache 21 in compressed form, and data that is cached in the L2 cache 21 in uncompressed form.

FIG. 5 schematically illustrates the operation of the texture mapper 36 in the present embodiment in more detail. FIG. 5 shows a graphics processing example that involves fragment shading, but it will be appreciated that more general "compute" shading would be possible. As shown in FIG. 5, the graphics processor 10 executes a tile-based graphics processing pipeline that includes, inter alia, a rasterizer 102 and a renderer 104, and stores an output array in the tile buffer 35.

In this system, the rasterizer 102 will rasterize input primitives into individual graphics fragments for processing. To do this, the rasterizer 102 rasterizes the primitives to sampling positions representing the render output, and generates graphics fragments representing appropriate sampling positions for rendering the primitives. Each fragment may represent a single sampling position or a set of plural sampling positions. The fragments generated by the rasterizer 102 are then sent onwards to the fragment shader (renderer) 104 for shading.

The fragment shader 104 executes shader programs for the fragments issued by the rasterizer 102 in order to render (shade) the fragments. The fragments are processed using execution threads in the shader core 24, with the threads executing the shader program(s) that are to be used to process the fragments. A thread is executed for each sampling position that is to be shaded.

A shader program may include texturing instructions for texture mapping operations that are required to be executed by the texture mapper 36.

When a texturing instruction is encountered by the fragment shader 104, a texturing instruction is sent from the fragment shader 104 to the texture mapper 36, requesting the texture mapper 36 to perform a texturing operation.

When instructed by the fragment shader 104 to perform a texture mapping operation, the texture mapper 36 reads decompressed texture data 200 from the texture cache 360 of the cache system (as required), performs the texture mapping operation, and returns a (e.g. RGB) colour sampled from the texture back to the fragment shader 104, for use when shading the fragment and sampling position(s) in question.

The "shaded" fragment sampling positions from the fragment shader 104 are then stored as part of the output in the tile buffer 35. Once a full "tile" of output data has been generated and stored in the tile buffer 35 in this manner, its data is exported from the tile buffer 35 to the main memory 20 (e.g. to a frame buffer in main memory) for storage via the cache system, and the next tile is then processed, and so on, until sufficient tiles have been processed to generate the entire render output (e.g. frame (image) to be displayed).

The Applicants have recognised that when a data array 200 is being processed by different shader cores 24A, 24B that have their own local caches 25A, 25B, the caches should be operated coherently. They have furthermore recognised that where there is a separate texture cache 360 that can also cache that data, the texture cache 360 should also be operated coherently. Thus, in the present embodiments, the texture cache 360 is operated coherently with the Load/Store cache 25.

The Applicants have found, however, that maintaining such cache coherency can result in a large amount of coherency traffic, and thus bandwidth consumption.

To facilitate a reduction in coherency traffic, embodiments of the technology described herein exploit the link between header and payload cache lines. This will be described in more detail below, in particular with reference to FIGS. 12 to 15.

Further features of the operation of the graphics processor 10 of FIGS. 3, 4 and 5 will now be described with reference to FIGS. 6 to 11.

The Applicants have recognised that for data that is cached in the L2 cache 21 in uncompressed form, there will be a "one-to-one" mapping between L1 and L2 cache lines, such that each L1 cache line will correspond to a respective single "parent" L2 cache line. In the case of data that is cached in the L2 cache 21 in compressed form, however, such a "one-to-one" mapping will typically not exist due to the expansion of data from compressed form to decompressed form, and typically plural L1 cache lines will correspond to the same "parent" L2 cache line. For example, in the case of a fixed compression ratio of 2:1, one cache line in the L2 cache 21 will correspond to two cache lines in the Load/Store (L1) cache 25 or texture mapper cache 360.

To allow for this, in the present embodiment, the L1 cache 25 is configured to use two separate address domains that are referred to as a "physical address" (PA) domain that is used for addressing data that is stored in memory 20 and the L2 cache 21 in uncompressed form, and an "uncompressed physical address" (UPA) that is used for addressing data that is stored in memory 20 and the L2 cache 21 in compressed form.

The PA domain corresponds to the "normal" address domain that the L2 cache 21 is configured to use, and thus maps "one-to-one" to physical addresses in memory 20. The UPA domain, however, is defined to provide a unique mapping between cache lines in the L2 cache 21 that cache data in compressed form, and cache lines at the L1 level that cache data in decompressed form. The encoder 31 and the decoder 33 are then operable to translate between the UPA domain used at the L1 level and the PA domain used at the L2 level. Each cache line at the L1 level also has associated with it an appropriate flag to indicate which address domain applies.

FIG. 6A illustrates this, and shows the L2 cache 21 having an exemplary set of cache lines 500 each tagged with a respective PA address 501 identifying the location in memory 20 where the data in the cache line is stored. FIG. 6A also shows the L1 cache 25 as including a number of corresponding cache lines 550. As shown in FIG. 6A, the tag for each cache line 550 in the L1 cache 25 includes either a PA address or a UPA address 553, and a "tag mode" flag 552 that indicates which of the two address domains the tag relates to (and so whether the data in the cache line is cached in the L2 cache 21 in compressed or uncompressed form).

Each cache line may further include a set of state information (not shown in FIG. 6A), such as flags indicating whether the cache line is valid or not, is dirty or not, is free or not, etc. . . . .

FIG. 6A also illustrates how data that is loaded into the L2 cache 21 from the memory 20 can be in either a compressed form or uncompressed form. For example, the first cache line 511 of the L2 cache 21 shown in FIG. 6A is illustrated as including a set of uncompressed data, and the second cache line 512 of the L2 cache 21 shown in FIG. 6A is illustrated as comprising sets of compressed data.

Data that is loaded into the L2 cache 21 in uncompressed form can be simply stored in the L1 cache 25 in uncompressed form. Thus, in the example illustrated in FIG. 6A, the L1 cache 25 includes a corresponding cache line 561 that includes a copy of the set of uncompressed data cached in the first cache line 511 of the L2 cache 21.

Data that is loaded into the L2 cache 21 in compressed form, however, will be decompressed by the decoder 33 before it is stored in the L1 cache 25 in decompressed form. Thus, in the example shown in FIG. 6A, the sets of compressed data in the second cache line 512 of the L2 cache 21 are stored in the L1 cache 25 in a decompressed, and so expanded, form in four corresponding cache lines 562-565. It will be appreciated that the example of FIG. 6A illustrates a 4:1 compression ratio, so that one compressed cache line in the L2 cache 21 corresponds to four UPA cache lines in the L1 cache 25. However, other arrangements would be possible.

A UPA address domain can be defined in any suitable way that provides a unique mapping between cache lines in the L2 cache 21 that cache data in compressed form, and L1 cache lines that cache data in decompressed form.

In the case of an AFBC encoding scheme, for example, a unique mapping between the UPA and PA domains may be provided by defining a UPA address as a concatenation of the physical address of a header data block with an index representing a data element of the data block that the header data block represents: UPA[47:0]={HeaderPA[39:4], byte_offset_within_block[11:0] }

Here, HeaderPA is the physical address (PA) of the header of a compression block 201, which in this case is a 16 byte aligned address, and byte_offset_within_block is the byte offset (index) of a sub-block 202 or element (e.g. texel or pixel) within the compression block 201.

FIG. 6B shows a comparison between a PA tag 61 and a UPA tag 62 according to this embodiment. As shown in FIG. 6B, a UPA address comprises a greater number of bits than a PA address to allow for the expansion from a compressed to uncompressed view.

A unique mapping may be provided for an AFRC encoding scheme by defining a UPA address in a similar way. In the case, for example, of a 2:1 compression ratio: UPA[47:0]={BodyPA[39:12], b'0000000, byte_offset_within_block [12:0]}

And in the case, for example, of a 4:1 compression ratio: UPA[47:0]={BodyPA[39:12], b'000000, byte_offset_within_block[13:0] }

Here, BodyPA is the address of the physical page, and byte_offset_within_block is the byte offset (index) of a sub-block or data element (e.g. texel or pixel) within the compression block.

An uncompressed virtual address (UVA) can also be defined in a similar way by concatenation of a header virtual address. It will also be appreciated that appropriate addressing logic for other block-based encoding schemes could be defined in a similar way.

As discussed above, in the present embodiments, the graphics processor 10 includes plural caches that can cache the same data (e.g. including one or more Load/Store (L1) caches 25A, 25B, and e.g. one or more texture caches 360). It is thus important to maintain cache coherence. In embodiments of the technology described herein, to accommodate the use of two separate address domains, two separate cache coherency protocols are used, one per address domain.

In particular, in the present embodiment, the L2 cache 21 maintains PA domain directory information 21A that is used to maintain coherency of data that is cached in the L2 cache 21 in uncompressed form. The L2 cache directory 21A thus keeps track of which L1 caches have a copy of each uncompressed cache line the L2 cache 21 is caching. Unique ownership of such a cache line can then be requested from the L2 cache directory 21A before the cache line can be written to.

As shown in FIGS. 3 and 4, the graphics processor 10 of the present embodiment further includes a UPA domain directory 22 that is used to maintain coherency of data that is cached in the L2 cache 21 in compressed form. As shown in FIGS. 3 and 4, the UPA domain directory 22 is provided at the L2 level, e.g. for symmetry with the PA domain directory information 21A maintained by the L2 cache 21.

Figure 7:
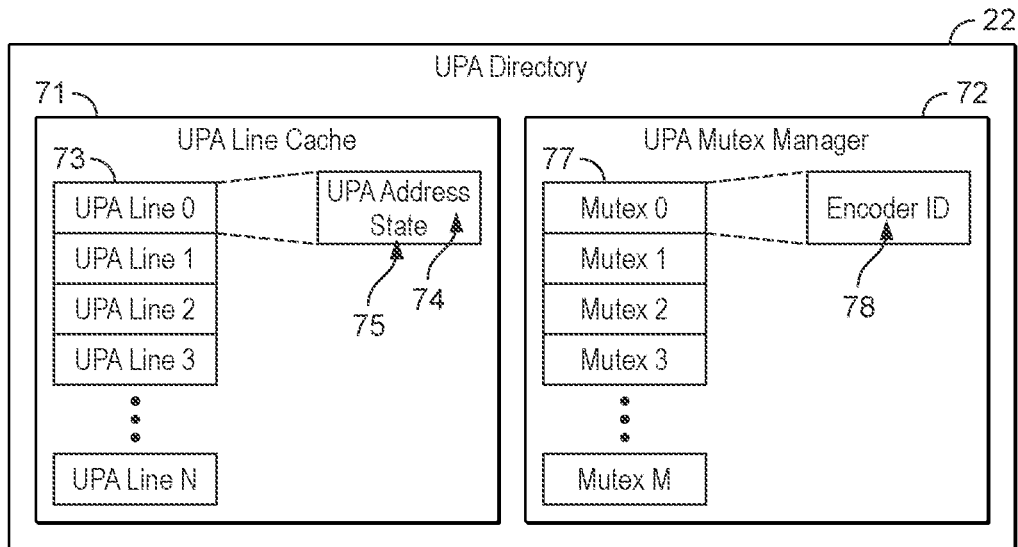
FIG. 7 shows a cache coherence directory in accordance with an embodiment of the technology described herein.

FIG. 7 shows the UPA domain directory 22 in more detail. The UPA domain directory 22 keeps track of, for each decompressed cache line that corresponds to a compressed cache line cached in the L2 cache 21, which L1 caches are caching the respective decompressed cache line.

Thus, as shown in FIG. 7, the UPA domain directory 22 includes a set of entries 71 including an entry 73 for each decompressed cache line that corresponds to a compressed cache line cached in the L2 cache 21. Each entry 73 indicates the respective UPA tag 74, and includes tag state information 75. An L1 cache can then request unique ownership of such a cache line from the UPA domain directory 22 before it can write to that cache line.

As illustrated in FIG. 7, the UPA domain directory 22 is a "dataless" coherence directory, meaning that it does not include copies of the data of the cache lines it is keeping track of. This can avoid the need for storage of a potentially large amount of decompressed (and thus expanded) data that the UPA domain directory 22 is keeping track of.

Figure 8:
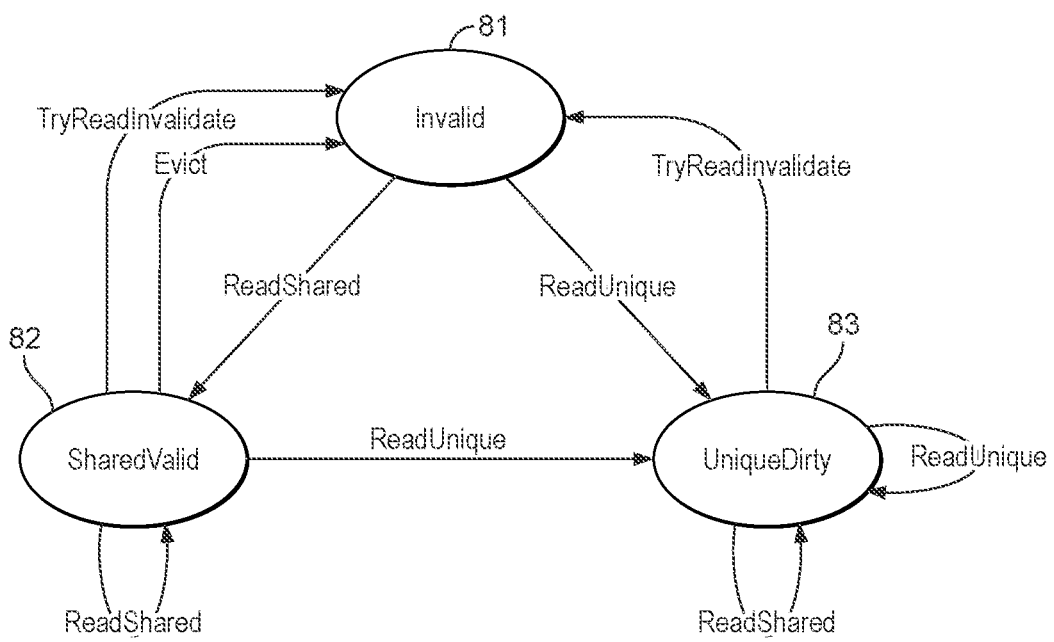
FIG. 8 shows a cache coherence state machine that the cache coherence directory of FIG. 7 may use in accordance with an embodiment of the technology described herein.

FIG. 8 illustrates possible states that the tag state information 75 can indicate, according to the present embodiment. As shown in FIG. 8, in the present embodiment, a cache line can be indicated by the UPA domain directory 22 as being "invalid" 81, "shared and valid" 82, or "unique and dirty" 83.

"Invalid" 81 indicates that data for the cache line is not up to date, and so valid data would need to be fetched from memory 20.

"Shared and valid" 82 indicates that at least one L1 cache is caching an up to date (valid) cache line. In this case, the tag state information 75 further includes a flag for each L1 cache, indicating which L1 caches are caching a valid cache line.

"Unique and dirty" 83 indicates that an L1 cache has unique ownership of a cache line and has updated (or is expected to update) that cache line, but the data in the L2 cache 21 (and memory 20) has not (yet) been updated.

It will be appreciated that other state machines would be possible. For example, it would be possible to indicate a cache line as being "shared and dirty".

As shown in FIG. 7, the UPA domain directory 22 also includes a mutex manager 72 that maintains a set of mutexes including a respective mutex 77 for each compression block 201 that the L2 cache 21 is caching. Each mutex 77 can be assigned to the encoder 31 of only one shader core 24 at any one time, and for these purposes the mutex manager 72 keeps track of the ID 78 of the encoder 31 that a mutex 77 is assigned to. The operation of the mutex manager 72 will be discussed in more detail below.

Figure 9:
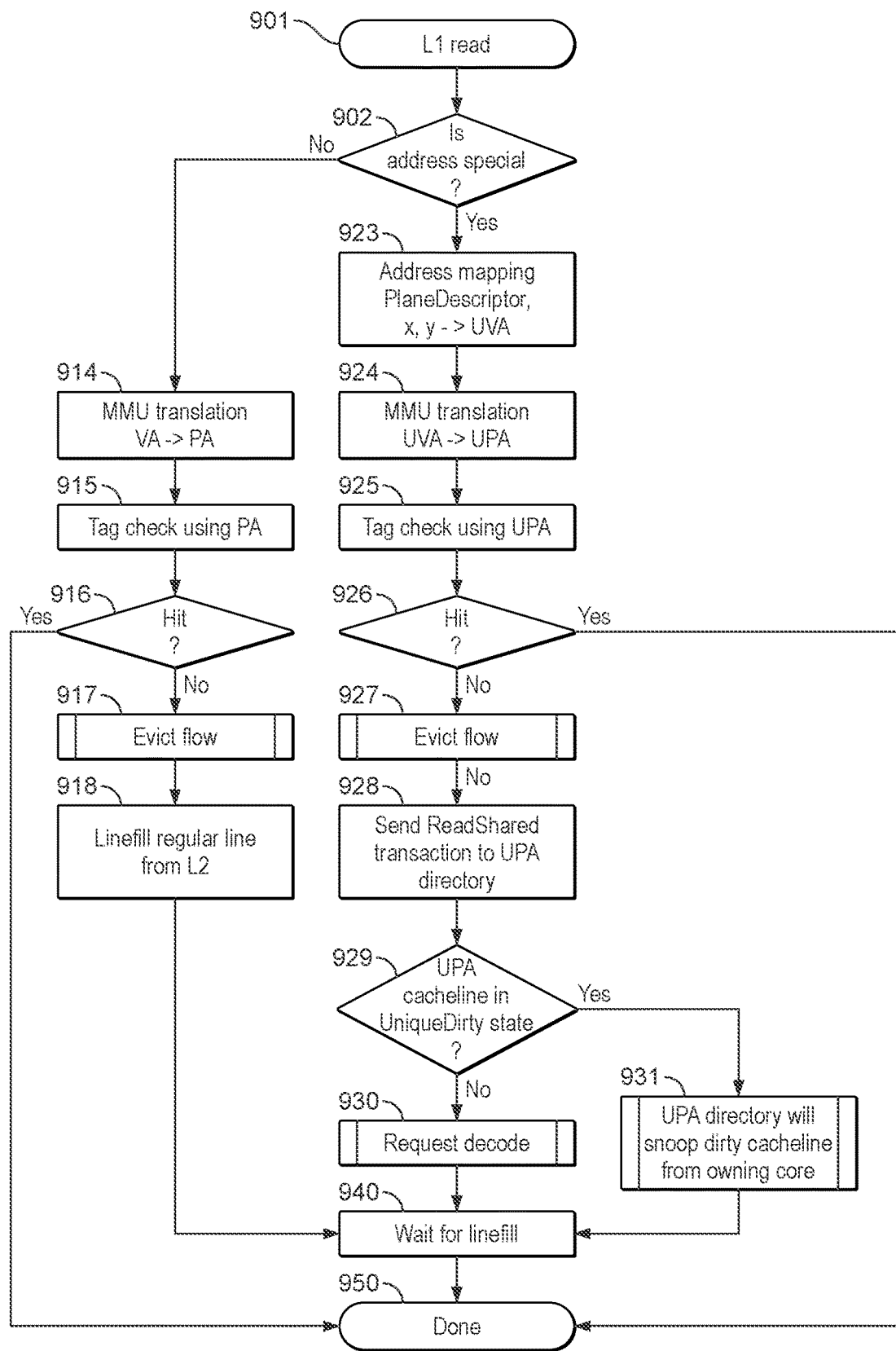
FIG. 9 shows a read process in accordance with an embodiment of the technology described herein.
Figure 10:
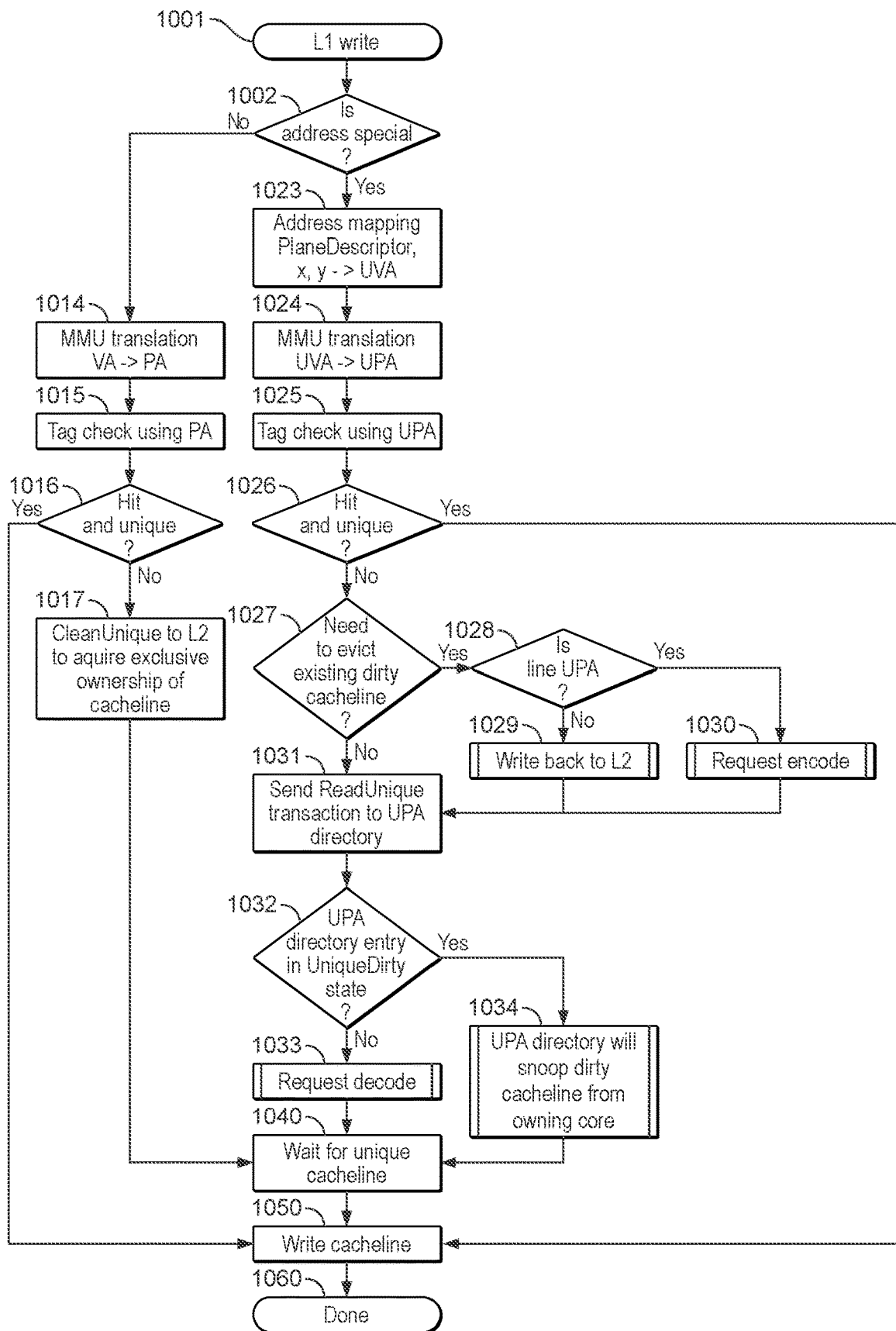
FIG. 10 shows a write process in accordance with an embodiment of the technology described herein.

FIGS. 9 and 10 show how L1 read and write requests are handled according to the present embodiment.

FIG. 9 shows the operation when data is being read from an L1 cache for use by a shader core 24 of the graphics processor 10.

As shown in FIG. 9, when a shader core 24 needs data for a processing operation that it is to perform, it will attempt to read that data from the appropriate L1 cache by issuing a read request 901. The read request 901 will typically be in the form of a request to read a particular coordinate from a particular data array (e.g. texture), and include a virtual address (VA) identifying the data that is required.

If (at step 902) the request 901 relates to an uncompressed data array, then in the present embodiment, it is handled according to steps 914 to 918 as shown in FIG. 9. If, on the other hand, the request 901 relates to a compressed data array (e.g. texture), then in the present embodiment, it is handled according to steps 923 to 931 as shown in FIG. 9.

As shown in FIG. 9, in the case of a request to read an uncompressed data array, the virtual address used in the request is translated from a virtual address (VA) to a physical address (PA) (at step 914), and then the physical address (PA) is used to determine (at step 915) whether a valid cache line containing the requested data is present in the L1 cache 25.

If (at step 916) a valid cache line containing the requested data is present in the L1 cache 25 (i.e. there is "hit" in the L1 cache 25), then the shader core 24 reads the data from the cache line in the L1 cache 25, and the process is complete (at step 950).

If (at step 916), however, a valid cache line containing the requested data is not present in the L1 cache 25 (i.e. there is a read "miss" in the L1 cache 25), then the requested data will need to be fetched into the L1 cache 25.

As shown in FIG. 9, before any data is fetched into the L1 cache 25, it is first determined (at step 917) whether any cache lines need to be evicted from the L1 cache 25. If there is an invalid entry in the L1 cache 25, then its data may be overwritten. Otherwise, an appropriate entry in the L1 cache 25 is evicted to the L2 level.

The required data is then requested (at step 918) from the L2 cache 21 using the determined physical address (PA).

In response to the request, the L2 cache 21 determines whether a valid cache line containing the requested data is present in the L2 cache 21. If it is, the cache line data is provided to L1 cache 25. If not, the appropriate data will be fetched into the L2 cache 21 (from memory 20 or from another L1 cache), and then provided to the L1 cache 25.

Once the required data has been provided to the L1 cache 25 (at step 940), the shader core 24 reads that data from the L1 cache 25, and the process is complete (at step 950).

As shown in FIG. 9, in the case of a request to read a compressed data array, the virtual address used in the request is initially translated from a virtual address (VA) to an uncompressed virtual address (UVA) (at step 923) (by concatenation of a header virtual address, as discussed above). The UVA address is then translated to an uncompressed physical address (UPA) (at step 924), and then the UPA is used to determine (at step 925) whether a valid cache line containing the requested data is present in the L1 cache 25.

If (at step 926) a valid cache line containing the requested data is present in the L1 cache 25 (i.e. there is "hit" in the L1 cache 25), then the shader core 24 reads the data from the cache line in the L1 cache 25, and the process is complete (at step 950).

If (at step 926), however, a valid cache line containing the requested data is not present in the L1 cache 25 (i.e. there is a read "miss" in the L1 cache 25), then the requested data will need to be fetched into the L1 cache 25.

As shown in FIG. 9, before any data is fetched into the L1 cache 25, it is first determined (at step 927) whether any cache lines need to be evicted from the L1 cache 25. If there is an invalid entry in the L1 cache 25, then its data may be overwritten. Otherwise, an appropriate entry (or entries) in the L1 cache 25 is evicted to the L2 level.

Then, the UPA domain directory 22 is notified that the requested data is required (at step 928) using the determined UPA.

In response to the request, the UPA domain directory 22 determines (at step 929) whether there is a "unique and dirty" decompressed cache line for that UPA. If there is, then another L1 cache currently has unique ownership of the decompressed cache line in question.

In this case, the UPA domain directory 22 will cause the decompressed cache line's data to be passed from that other L1 cache to the L1 cache 25 (at step 931). This may involve the decompressed cache line being evicted from the other L1 cache into the L2 cache 21 in decompressed form, and then being provided therefrom to the L1 cache 25. The UPA domain directory 22 will also be updated to indicate that the receiving L1 cache 25 now has unique ownership of the decompressed cache line.

If (at step 929) the UPA domain directory 22 indicates that there is not a corresponding "unique and dirty" decompressed cache, then a decode operation will be required.

If the UPA domain directory 22 indicates that there is a corresponding "shared and valid" decompressed cache line, then decoding of the corresponding compressed cache line cached in the L2 cache 21 will be requested (at step 930), and the decompressed data will be decoded and provided to the L1 cache 25. The UPA domain directory 22 will also be appropriately updated to indicate that the L1 cache 25 now (also) has a valid copy of the decompressed cache line.

Otherwise, the compressed data will be fetched from memory 20 into the L2 cache 21, decoding will be requested (at step 930), the data will be decoded, and the decompressed data provided to the L1 cache 25. In this case, an appropriate new entry (or entries) will be added to the UPA domain directory 22.

Once the required data has been provided to the L1 cache 25 (at step 940), the shader core 24 reads that data from the L1 cache 25, and the process is complete (at step 950).

FIG. 10 shows the operation when data is to be written to the L1 cache 25 by a shader core 24 of the graphics processor 10.

As shown in FIG. 10, when writing data a shader core 24 will issue a write request 1001. The write request 1001 will typically be in the form of a request to write a particular coordinate of a particular data array (e.g. texture), and include a virtual address (VA) identifying the data that is being written.

If (at step 1002) the request 1001 relates to an uncompressed data array (e.g. texture), then in the present embodiment, it is handled according to steps 1014 to 1017 as shown in FIG. 10. If, on the other hand, the request 1001 relates to a compressed data array (e.g. texture), then in the present embodiment, it is handled according to steps 1023 to 1034 as shown in FIG. 10.

As shown in FIG. 10, in the case of a request to write to an uncompressed data array (e.g. texture), the virtual address used in the request is translated from a virtual address (VA) to a physical address (PA) (at step 1014), and then the physical address (PA) is used to determine (at step 1015) whether a unique copy of the cache line to be written to is present in the L1 cache 25.

If (at step 1016) a unique copy of the cache line is present in the L1 cache 25 (there is "hit" in the L1 cache 25 and the cache line state is "unique"), then the shader core 24 writes the data to the cache line in the L1 cache 25 (at step 1050), and the process is complete (at step 1060).

If (at step 1016), however, a unique copy of the cache line to be written to is not present in the L1 cache 25 (the cache line state is not "unique"), then the L1 cache 25 needs to acquire unique ownership of the cache line.

Unique ownership of the cache line is therefore requested (at step 1017), and then when the L1 cache 25 has unique ownership of the cache line in question (at step 1040), the shader core 24 writes the data to the cache line in the L1 cache 25 (at step 1050), and the process is complete (at step 1060).

As shown in FIG. 10, in the case of a request to write to a compressed data array (e.g. texture), the virtual address used in the request is initially translated from a virtual address to an uncompressed virtual address (UVA) (at step 1023). The UVA address is then translated to an uncompressed physical address (UPA) (at step 1024), and then the UPA is used to determine (at step 1025) whether a unique copy of the cache line to be written to is present in the L1 cache 25.

If (at step 1026) a unique copy of the cache line is present in the L1 cache 25 (there is "hit" in the L1 cache 25 and the cache line state is "unique"), then the shader core 24 writes the data to the cache line in the L1 cache 25 (at step 1050), and the process is complete (at step 1060).

If (at step 1026), however, a unique copy of the cache line to be written to is not present in the L1 cache 25 (the cache line state is not "unique"), then the L1 cache 25 needs to acquire unique ownership of the cache line.

As shown in FIG. 10, in this case it is first determined (at step 1027) whether an existing "dirty" entry (cache line) needs to be evicted. If so, it is determined (at step 1028) whether the tag mode flag 552 for the dirty entry indicates a UPA or PA domain. If the flag 552 indicates the PA domain, then the dirty entry to be evicted is written back to the L2 cache 21 in uncompressed form (at step 1029). If, however, the flag 552 indicates the UPA domain, then the dirty entry to be evicted is first encoded and then written back to the L2 cache 21 in compressed form (at step 1030).

Then, the UPA domain directory 22 is notified that unique ownership of the cache line to be written is required (at step 1031) using the determined UPA.

In response to the request, the UPA domain directory 22 determines whether the cache system is caching a valid copy of the cache line to be written to that is in the "unique and dirty" state (step 1032).

If the cache system is already caching a valid copy of the cache line to be written to, and the state of the cache line to be written to is indicated by the UPA domain directory 22 as being "unique and dirty", that indicates that another L1 cache currently has unique ownership of the cache line in question.

In this case, the UPA domain directory 22 will cause the cache line in question to be transferred from that other L1 cache to the L1 cache 25 (at step 1034). This may involve the decompressed cache line being evicted from the other L1 cache into the L2 cache in decompressed form, and then being provided therefrom to the L1 cache 25. The sending L1 cache and UPA domain directory 22 will also be updated to indicate that the receiving L1 cache 25 now has unique ownership.

If (at step 1032) the cache line to be written to is not indicated by the UPA domain directory 22 as being "unique and dirty", i.e. if it is indicated by the UPA domain directory 22 as being "shared and valid", then a decode operation will be required.

Thus, in this case, decoding of the corresponding compressed cache line cached in the L2 cache 21 is requested (at step 1033), the data is decoded, and the decompressed data is provided to the L1 cache 25. The UPA domain directory 22 will also be appropriately updated to indicate that the L1 cache 25 now has unique ownership of the cache line ("unique and dirty"), and corresponding entries in other L1 caches will be updated to indicate invalid entries.

Then, when the L1 cache 25 has unique ownership of the cache line to be written to (at step 1040), the shader core 24 writes the data to the cache line in the L1 cache 25 (at step 1050), and the process is complete (at step 1060).

Further features of the operation of the graphics processor 10 will now be described.

As discussed above, the Applicants have recognised that for data that is cached in the L2 cache 21 in uncompressed form, each L1 cache line will correspond to a respective single "parent" L2 cache line, whereas in the case of data that is cached in the L2 cache 21 in compressed form, plural L1 cache lines will typically correspond to the same "parent" L2 cache line.

FIG. 6A illustrates this, and shows an example in which the L2 cache 21 includes a first cache line 511 that caches uncompressed header data for a compression block 201, and a second cache line 512 that caches corresponding compressed payload data for the compression block 201. FIG. 6A also shows the L1 cache 25 as including a number of corresponding cache lines, including a copy of the first, uncompressed header cache line 561, and four cache lines 562-565 that cache the compressed payload data for the compression block 201 in decompressed form.

Thus, in this example, the single uncompressed L1 header cache line 561 corresponds to (only) a single L2 cache line 511, whereas the four decompressed L1 cache lines 562-565 correspond to the same single compressed L2 cache line 512.

In this example, where data corresponding to one of the decompressed L1 cache lines 562-565 has been updated, eviction of one of the decompressed L1 cache lines 562-565 from the Load/Store (L1) cache 25 to the L2 cache 21 will involve compressing the data corresponding to all four decompressed L1 cache lines 562-565 to generate updated compressed payload data and updated header data for the compression block 201, writing the updated compressed payload data to the corresponding L2 cache line 512, and writing the updated header data to the corresponding L2 cache line 511.

Thus, the eviction of a single L1 cache line from the Load/Store (L1) cache 25 can involve updating one or more cache lines in the L2 cache 21 that correspond to a greater number of L1 cache lines.

To facilitate cache coherence in this situation, in the present embodiment, the eviction of an L1 cache line from the Load/Store (L1) cache 25 that caches data for a compression block 201 can trigger the invalidation of all (e.g. header and payload) cache lines in the Load/Store (L1) cache 25 and texture mapper cache 360 that cache data for the same compression block 201. For example, in the FIG. 6A example, eviction of one of cache lines 562-565 from the Load/Store (L1) cache 25 triggers invalidation of any corresponding header or payload cache lines in the texture mapper cache 360.

Figure 11:
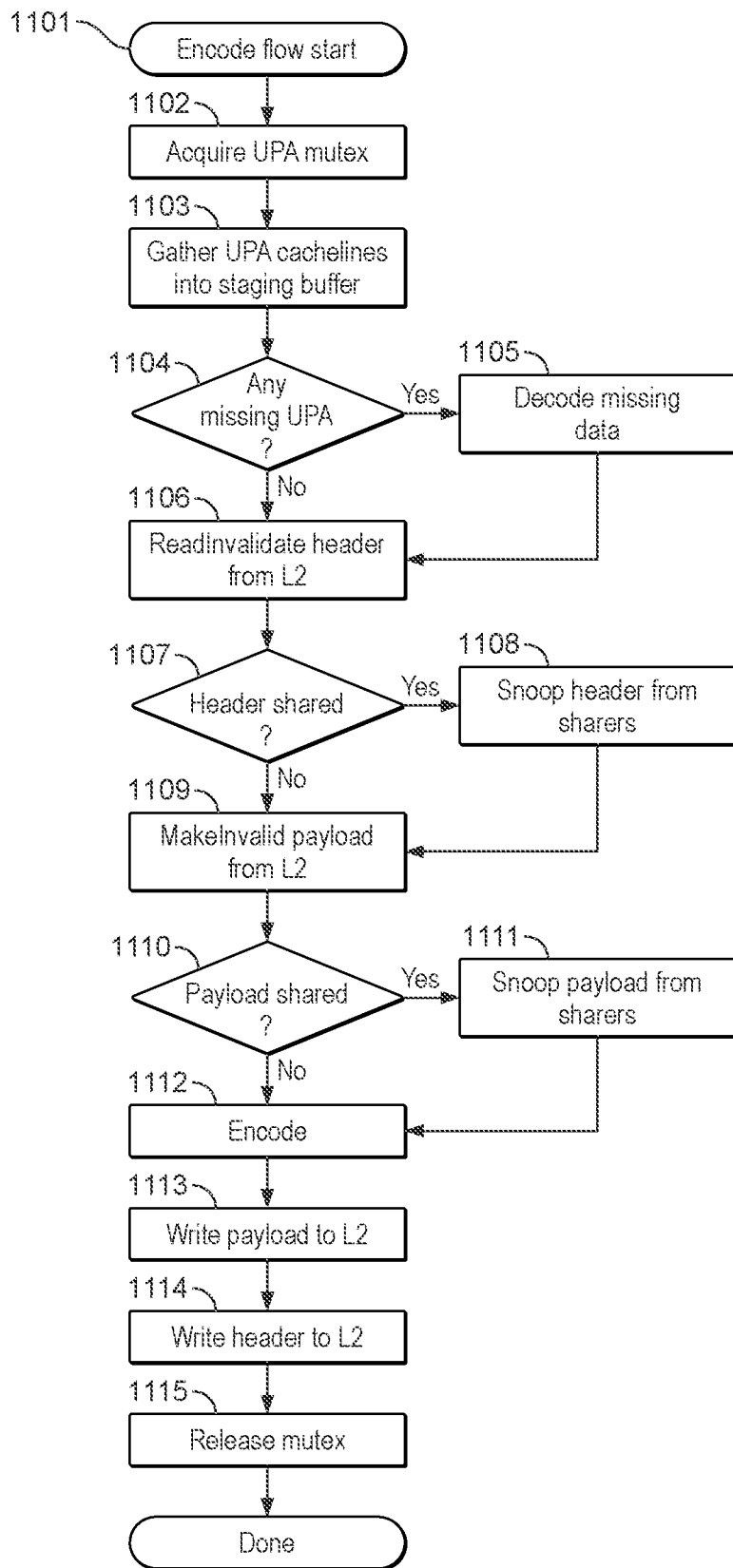
FIG. 11 shows an evict process in accordance with an embodiment of the technology described herein.

FIG. 11 shows the operation when a decompressed cache line is to be evicted from the L1 cache 25 of a shader core 24 and stored in the L2 cache 21 in compressed form, according to the present embodiment.

As shown in FIG. 11, when a cache line is to be evicted to the L2 cache 21 and stored in compressed form, a request for encoding will be issued to the encoder 31 (at step 1101).

In response to the request, the encoder 31 will request the mutex 77 from the UPA domain directory 22 that corresponds to the compression block 201 that is to be encoded using the UPA of the cache line being evicted. Once the encoder 31 has acquired the mutex for the compression block 201 (at step 1102), the encoder will then attempt to gather all of the other decompressed cache lines corresponding to the compression block 201 into its staging buffer 32 (at step 1103).

In the present embodiment, to do this, the encoder 31 will first attempt to locate valid decompressed cache lines corresponding to the compression block 201 in its local L1 cache 25 by issuing UPA read requests to the local L1 cache 25.

If, after attempting to locate valid decompressed cache lines in the local L1 cache 25, there remain missing cache lines corresponding to the compression block 201, the encoder 31 will then look for any dirty cache lines corresponding to the compression block 201 in other L1 caches of the graphics processor 10. To do this, the encoder 31 issues UPA read requests to the UPA domain directory 22, in response to which the UPA domain directory 22 will cause any dirty cache lines corresponding to the compression block 201 in other L1 caches to be passed to the staging buffer 32 of the encoder (via the L2 cache 21).

If (at step 1104), after attempting to locate cache lines in the local and other L1 caches, there remain missing cache lines corresponding to the compression block 201, then the missing cache lines are provided by decoding the compressed compression block 201 stored in the L2 cache 21. Thus, as shown in FIG. 11, in this case, the encoder 31 requests a decode of the compression block 201 (at step 1105), the compression block 201 is decoded, and the missing decompressed cache lines are passed to the staging buffer 32 of the encoder 31.

Then, once all of the decompressed cache lines corresponding to the compression block 201 have been gathered in the staging buffer 32 of the encoder 31, the encoder 31 reads and invalidates (at step 1106) the cache line in the L2 cache 21 containing the header for the compression block 201. If (at step 1107) a header cache line is shared at the L1 level (e.g. in the texture mapper cache 360), then the L1 level header cache line(s) is also invalidated (at step 1108).

Then, payload cache lines at the L2 level corresponding to the compression block 201 are invalidated (at step 1109). If (at step 1110) a payload cache line is shared at the L1 level (e.g. in the texture mapper cache 360), then the L1 level payload cache lines are also invalidated (at step 1111).

Then, once all of the L2 and L1 level cache lines corresponding to the compression block have been invalidated, the encoder 32 encodes the cache lines gathered in the staging buffer 32 (at step 1112), writes new payload cache lines to the L2 cache 21 (at step 1113), writes a new header cache line to the L2 cache 21 (at step 1114), and then releases the mutex 77 (at step 1115).

Invalidating all L1 level cache lines corresponding to the compression block 201 before updating the compression block data at the L2 level can facilitate cache coherence, since any subsequent access to the compression block data at the L1 level (e.g. by the texture mapper cache 360) will involve the updated compression block data needing to be fetched from the L2 level (and decompressed).

Moreover, invaliding header cache lines before payload cache lines, and updating header cache lines after payload cache lines, can facilitate cache coherence since a header cache line will only ever be valid after the corresponding payload cache lines have been appropriately updated.

The above describes certain features of the operation of the graphics processor 10 of FIGS. 3, 4 and 5. Further features of the operation of the graphics processor 10 in accordance with embodiments of the technology described herein will now be described.

The Applicants have recognised that although the eviction process described above with reference to FIG. 11 can facilitate cache coherence, it may involve a relatively large number of coherency transactions passing between the L1 and L2 levels. For example, invalidating L2 payload cache lines (at step 1109) and invalidating L1 payload cache lines (at step 1111) may involve a transaction passing between the L1 and L2 levels for each payload cache line in question. The Applicants have recognised that it is possible to reduce such coherency traffic by exploiting the link between header and payload cache lines, whereby header data must first be accessed in order to then access associated payload data.

In particular, and as discussed above, in embodiments of the technology described herein, information is maintained by an L1 level cache (e.g. Load/Store (L1) cache 25A, 25B, and/or texture cache 360) that indicates any links between header cache lines and associated payload cache lines within the cache. The maintained "link information" can then be used, for example, to trigger invalidation of all associated payload cache lines in an L1 level cache when the cache receives a request to invalidate a header cache line (e.g. at step 1108 in FIG. 11). Payload cache lines can thereby be invalidated without the need for additional coherency transactions passing between the L1 and L2 levels. For example, steps 1109-1111 shown in FIG. 11 may be effectively omitted.

Figure 12:
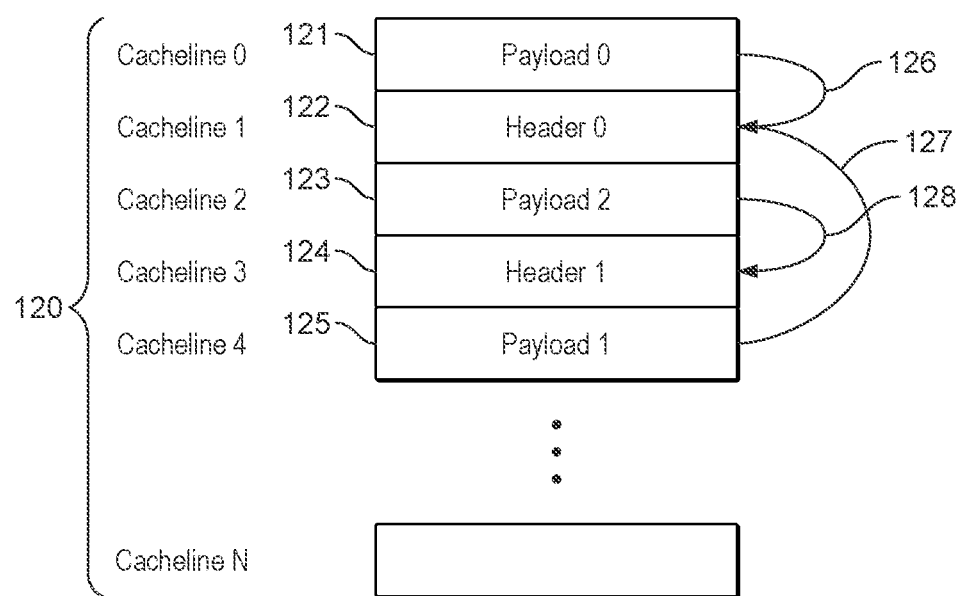
FIG. 12 illustrated linked cache lines in accordance with an embodiment of the technology described herein.

FIG. 12 illustrates link information maintained by an L1 level cache (e.g. Load/Store (L1) cache 25A, 25B, texture cache 360) according to the present embodiment. FIG. 12 shows an example L1 cache as including a number of cache lines 120, including two payload cache lines 121, 125 that are associated with header cache line 122, and one payload cache line 123 that is associated with another header cache line 124. As illustrated in FIG. 12, in this embodiment each payload cache line includes link information in the form of a pointer 126-128 pointing to the associated header cache line.

Figure 13:
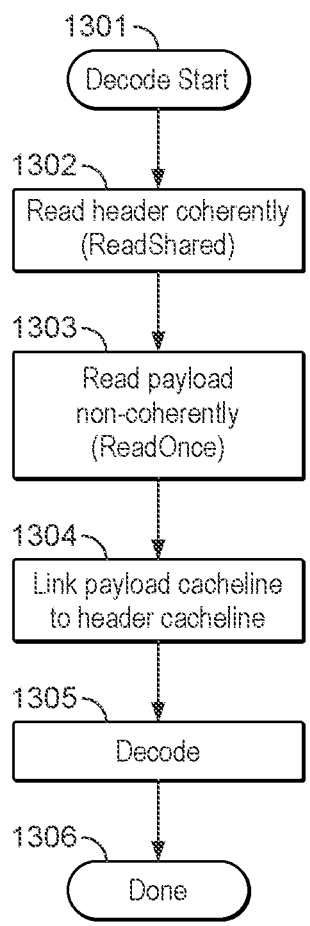
FIG. 13 shows a read process in accordance with an embodiment of the technology described herein.

FIG. 13 illustrates the operation when compressed cache line data is to be fetched from the L2 cache 21 into an L1 level cache (e.g. Load/Store (L1) cache 25A, 25B, and/or texture cache 360), according to the present embodiment.

As shown in FIG. 13, when compressed cache line data is to be fetched into an L1 cache, the L1 cache will issue a request for decoding to the decoder 33 (at step 1301). The request may include a requested UPA address.

In response to the request, the decoder 33 will translate the UPA address to a PA address of the header for the compression block 201 to be decoded, and then issue a PA read request to the L2 cache 21 in order to read the header into the decoder cache 34 (at step 1302). As shown in FIG. 13, the request to read the header is in the form of a "ReadShared" request, which triggers the L2 cache 21 to provide the requested header cache line, and causes the header cache line to be marked as shared in the L2 cache directory 21A.

The decoder 33 will then use the read header information to determine PA information for payload cache lines for the compression block 201 to be decoded, and issue appropriate PA read requests to the L2 cache 21 in order to fetch the payload data into the decoder cache 34 (at step 1303).

These payload read requests could be in the form of "ReadShared" requests, and thus cause read payload cache lines to be marked as shared in the L2 cache directory 21A. However, in the present embodiment, as shown in FIG. 13, requests to read payload data are in the form of a "ReadOnce" request, which triggers the L2 cache 21 to provide a requested payload cache line, but without causing the payload cache line to be marked as shared in the L2 cache directory 21A. This can then avoid coherency traffic which could otherwise be triggered were the payload cache lines to be marked as shared in the L2 cache directory 21A.

As shown in FIG. 13, rather than marking a payload cache line as being shared at the L2 level, link information indicating the header cache line that the payload cache line is associated with is added to the payload cache line at the L1 level (at step 1304).

Once the header cache line and all of the associated payload cache lines have been read in into the decoder cache 34, and linked, the decoder 33 decompresses the compressed payload data, and provides the required decompressed cache line and link information to the requesting L1 cache.

Figure 14:
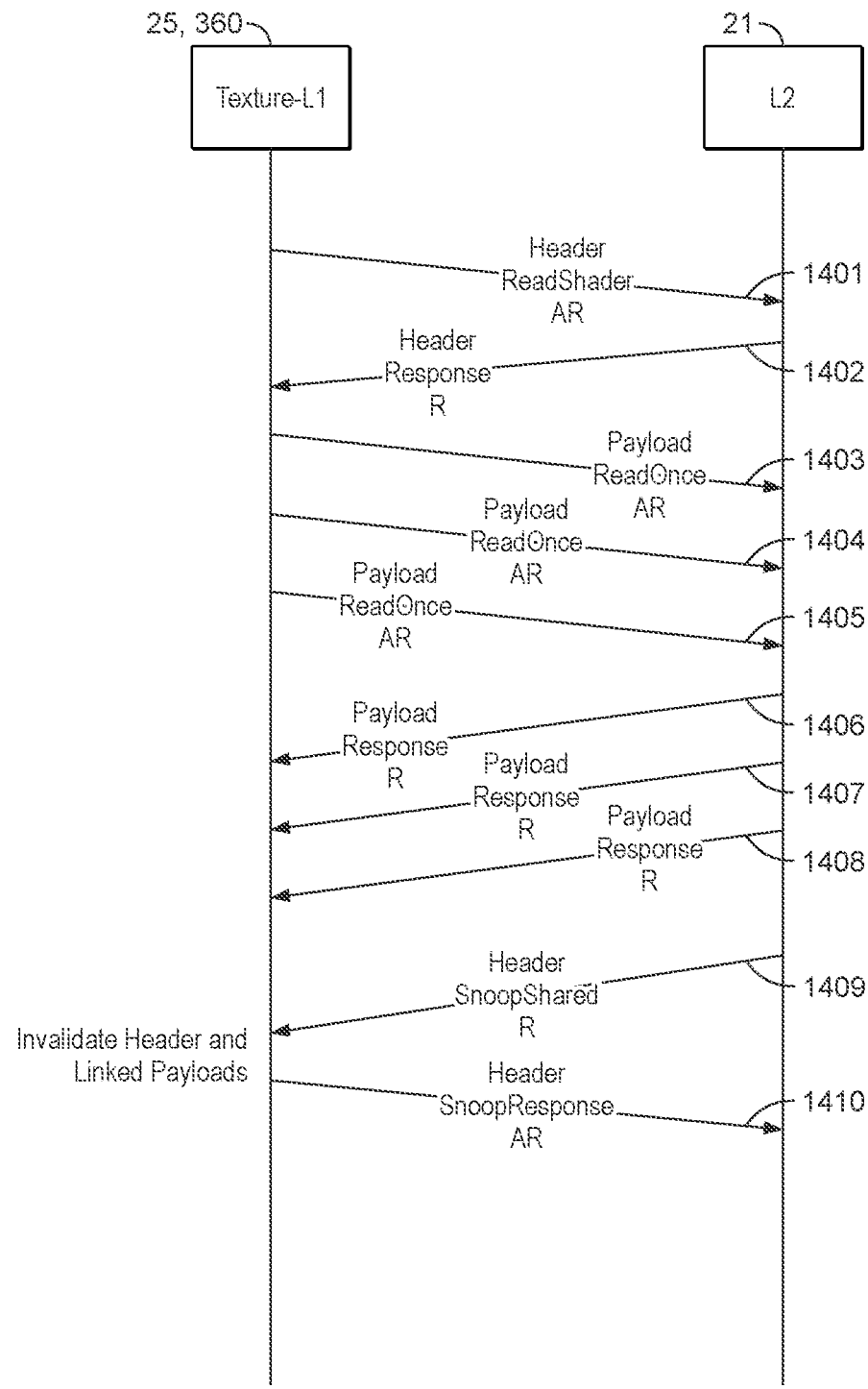
FIG. 14 shows a read and invalidation process in accordance with an embodiment of the technology described herein.

FIG. 14 shows an example sequence of coherency transactions according to the present embodiment. As shown in FIG. 14, in response to a request 1401 from an L1 level cache (e.g. Load/Store (L1) cache 25A, 25B, texture cache 360) to read a header cache line, the L2 cache 21 responds 1402 with the requested header data. As shown in FIG. 14, the request to read the header is in the form of a "ReadShared" request, and so causes the header cache line to be marked as shared in the L2 cache directory 21A.

The read header information is then used to generate requests 1403-1405 to read in payload cache lines associated with the header, and the L2 cache 21 responds 1406-1408 with the requested payload data. As shown in FIG. 14, a request to read payload data is in the form of a "ReadOnce" request, which does not cause the payload cache line to be marked as shared in the L2 cache directory 21A. Instead, a pointer to the associated header cache line is included in each L1 payload cache line.

As shown in FIG. 14, a single request 1409 from the L2 level to invalidate an L1 level header cache line can then trigger invalidation of the header cache line and all of the linked payload cache lines, e.g. rather than requiring multiple requests from the L2 level. Similarly, a single 1410 response can indicate that a header cache line and all linked payload cache lines have been invalidated, e.g. rather than multiple responses.

Figure 15:
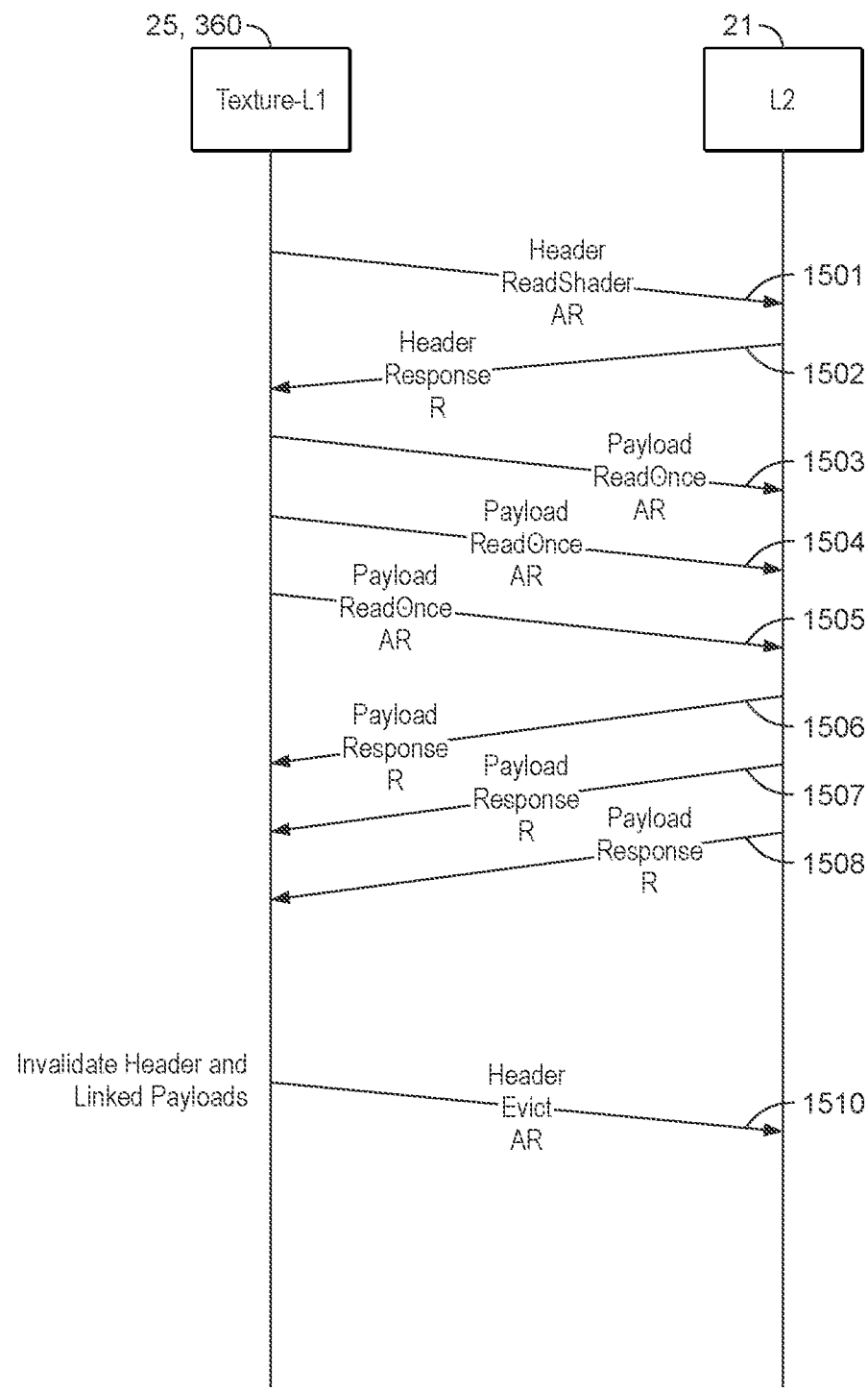
FIG. 15 shows a read and eviction process in accordance with an embodiment of the technology described herein.

FIG. 15 shows another example sequence of coherency transactions according to the present embodiment. As shown in FIG. 15, in response to a request 1501 from an L1 level cache (e.g. Load/Store (L1) cache 25A, 25B, texture cache 360) to read a header cache line, the L2 cache 21 responds

1502 with the requested header data. As shown in FIG. 15, the request to read the header is in the form of a "Read-Shared" request, and so causes the header cache line to be marked as shared in the L2 cache directory 21A.

The read header information is then used to generate requests 1503-1505 to read in payload cache lines associated with the header, and the L2 cache 21 responds 1506-1508 with the requested payload data. As shown in FIG. 15, a request to read payload data is in the form of a "ReadOnce" request, which does not cause the payload cache line to be marked as shared in the L2 cache directory 21A. Instead, a pointer (i.e. link information) to the associated header cache line is included in each L1 payload cache line.

As shown in FIG. 15, when the header cache line is subsequently evicted 1510 to the L2 cache 21 and invalidated at the L1 level, the link information is used to trigger invalidation of all linked payload cache lines at the L1 level.

In these embodiments, invalidation of a header cache line could trigger immediate invalidation of linked payload cache lines. However, in some situations, such as where a payload cache line is locked, this may not be possible. To account for this, in the present embodiment, when a header cache line is invalidated, linked payload cache lines are marked as "deferred invalidate", and the cache system will then attempt to invalidate a "deferred invalidate" payload cache line as soon as possible, e.g. once the lock is released. The cache system is configured such that a cache line that is marked as "deferred invalidate" cannot return a cache "hit".

It will be appreciated from the above that the technology described herein, in its embodiments at least, provides arrangements in which cache coherency traffic and associated bandwidth requirements, can be reduced. This is achieved, in the embodiments of the technology described herein at least, by maintaining link information that indicates links between associated payload and header cache lines in a cache.

The foregoing detailed description has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

What is claimed is:

1. A method of operating a cache system that comprises plural coherent caches operable to cache data stored in memory for a processor;

the method comprising:

maintaining link information indicating, for a cache entry in a cache of the plural coherent caches that caches payload data that is associated with header data that is cached by another cache entry in the same cache, a link between the cache entry in the cache that caches the payload data and the another cache entry in the same cache that caches the header data; and maintaining cache coherence for the plural coherent caches using the link information by, in response to invalidation of a cache entry in the cache that caches header data:

using the link information to identify any cache entries in the same cache that cache payload data that is associated with the header data; and invalidating the identified cache entries.

2. The method of claim 1, wherein the link information comprises one or more pointers, each pointer pointing from a cache entry in the cache to another cache entry in the same cache.

3. The method of claim 1, comprising:

maintaining coherency information that indicates what header data is cached by the plural coherent caches;

maintaining cache coherence for the plural coherent caches in respect of header data using the coherency information; and maintaining cache coherence for the plural coherent caches in respect of payload data using the link information.

4. The method of claim 1, comprising invalidating the cache entry that caches the header data when evicting the cache entry that caches the header data from the cache, or in response to a request to invalidate the cache entry that caches the header data.

5. The method of claim 1, wherein invalidating a cache entry in the cache that caches payload data comprises marking the cache entry as requiring invalidation, and then invalidating the marked cache entry.

6. The method of claim 1, wherein the cache system further comprises a higher level cache operable to cache payload data in compressed form, and the plural coherent caches are lower level caches operable to cache payload data cached by the higher level cache in decompressed form.

7. The method of claim 1, wherein payload data and associated header data comprise data for the same compression block.

8. The method of claim 1, wherein the processor is a graphics processing unit.

9. A non-transitory computer readable storage medium storing software code which when executing on a processor performs a method as claimed in claim 1.

10. A method of operating a cache system that comprises plural coherent caches operable to cache data stored in memory for a processor;

the method comprising:

maintaining link information indicating, for a cache entry in a cache of the plural coherent caches that caches payload data that is associated with header data that is cached by another cache entry in the same cache, a link between the cache entry in the cache that caches the payload data and the another cache entry in the same cache that caches the header data;

maintaining coherency information that indicates what header data is cached by the plural coherent caches;

maintaining cache coherence for the plural coherent caches in respect of header data using the coherency information; and maintaining cache coherence for the plural coherent caches in respect of payload data using the link information.

11. A cache system comprising:

plural coherent caches operable to cache data stored in memory for a processor; and a link maintaining circuit configured to maintain link information indicating, for a cache entry in a cache of the plural coherent caches that caches payload data that is associated with header data that is cached by another cache entry in the same cache, a link between the cache entry in the cache that caches the payload data and the another cache entry in the same cache that caches the header data;

wherein the cache system is configured to maintain cache coherence for the plural coherent caches using link information maintained by the link maintaining circuit by, in response to invalidation of a cache entry in the cache that caches header data:

using the link information to identify any cache entries in the same cache that cache payload data that is associated with the header data; and invalidating the identified cache entries.

12. The system of claim 11, wherein the link information comprises one or more pointers, each pointer pointing from a cache entry in the cache to another cache entry in the same cache.

13. The system of claim 11, wherein the cache system is configured to:

maintain coherency information that indicates what header data is cached by the plural coherent caches;

maintain cache coherence for the plural coherent caches in respect of header data using the coherency information; and maintain cache coherence for the plural coherent caches in respect of payload data using the link information.

14. The system of claim 11, wherein the cache system is configured to invalidate the cache entry that caches the header data when evicting the cache entry that caches the header data from the cache, or in response to a request to invalidate the cache entry that caches the header data.

15. The system of claim 11, wherein the cache system is configured to invalidate a cache entry in the cache that caches payload data by marking the cache entry as requiring invalidation, and then invalidating the marked cache entry.

16. The system of claim 11, wherein the cache system further comprises a higher level cache operable to cache payload data in compressed form, and the plural coherent caches are lower level caches operable to cache payload data cached by the higher level cache in decompressed form.

17. The system of claim 11, wherein payload data and associated header data comprise data for the same compression block.

18. A data processor comprising the cache system of claim 11.

19. The system or processor of claim 11, wherein the processor is a graphics processing unit.

20. A cache system comprising:

plural coherent caches operable to cache data stored in memory for a processor; and a link maintaining circuit configured to maintain link information indicating, for a cache entry in a cache of the plural coherent caches that caches payload data that is associated with header data that is cached by another cache entry in the same cache, a link between the cache entry in the cache that caches the payload data and the another cache entry in the same cache that caches the header data;

wherein the cache system is configured to:

maintain coherency information that indicates what header data is cached by the plural coherent caches;

maintain cache coherence for the plural coherent caches in respect of header data using the coherency information; and maintain cache coherence for the plural coherent caches in respect of payload data using link information maintained by the link maintaining circuit.

* * * * *